US006587099B2

(12) United States Patent
Takekawa

(10) Patent No.: US 6,587,099 B2
(45) Date of Patent: Jul. 1, 2003

(54) COORDINATE INPUT/DETECTION DEVICE DETECTING INSTALLATION POSITION OF LIGHT-RECEIVING DEVICE USED FOR DETECTING COORDINATES

(75) Inventor: Kenichi Takekawa, Aichi (JP)

(73) Assignee: Ricoh Company, Ltd., Tokyo (JP)

( * ) Notice: Subject to any disclaimer, the term of this patent is extended or adjusted under 35 U.S.C. 154(b) by 140 days.

(21) Appl. No.: 09/784,085

(22) Filed: Feb. 16, 2001

(65) Prior Publication Data

US 2002/0163505 A1 Nov. 7, 2002

(30) Foreign Application Priority Data

Feb. 18, 2000 (JP) ........................................ 2000-040529

(51) Int. Cl.[7] ........................... G08C 21/00; G09G 5/00
(52) U.S. Cl. ...................... 345/175; 345/156; 345/173; 345/178; 178/18.03; 178/18.09
(58) Field of Search ................................. 345/156, 173, 345/175, 178, 179; 178/18.09, 18.03

(56) References Cited

U.S. PATENT DOCUMENTS

| 4,144,449 | A | | 3/1979 | Funk et al. | |
|---|---|---|---|---|---|
| 4,507,557 | A | * | 3/1985 | Tsikos | 345/173 |
| 4,703,316 | A | * | 10/1987 | Sherbeck | 345/173 |
| 4,782,328 | A | * | 11/1988 | Denlinger | 345/173 |
| 4,811,004 | A | | 3/1989 | Person et al. | |
| 4,980,547 | A | * | 12/1990 | Griffin | 345/173 |
| 5,248,856 | A | * | 9/1993 | Mallicoat | 345/173 |
| 5,298,737 | A | * | 3/1994 | Proper | 345/173 |
| 5,414,413 | A | * | 5/1995 | Tamaru et al. | 345/173 |
| 6,100,538 | A | * | 8/2000 | Ogawa | 345/173 |
| 6,104,387 | A | * | 8/2000 | Chery et al. | 345/179 |
| 6,285,359 | B1 | * | 9/2001 | Ogasawara et al. | 345/175 |
| 6,335,724 | B1 | * | 1/2002 | Takekawa et al. | 345/173 |
| 6,456,280 | B2 | * | 9/2002 | Holtzman | 345/173 |
| 2001/0028344 | A1 | * | 10/2001 | Iwamoto et al. | 345/173 |

FOREIGN PATENT DOCUMENTS

EP 0 279 652 8/1988

OTHER PUBLICATIONS

U.S. patent application Ser. No. 09/784,085, filed Feb. 16, 2001, pending.
U.S. patent application Ser. No. 09/799,018, filed Mar. 06, 2001, pending.
U.S. patent application Ser. No. 09/349,461, filed Jul. 9, 1999, pending.
U.S. patent application Ser. No. 09/487,672, filed Jan. 20, 2000, pending.
U.S. patent application Ser. No. 09/577,496, filed May 25, 2000, pending.
U.S. patent application Ser. No. 09/594,724, filed Jun. 16, 2000, pending.
U.S. patent application Ser. No. 09/653,336, filed Aug. 31, 2000, pending.

* cited by examiner

Primary Examiner—Bipin Shalwala
Assistant Examiner—David L. Lewis
(74) Attorney, Agent, or Firm—Oblon, Spivak, McClelland, Maier & Neustadt, P.C.

(57) ABSTRACT

A coordinate input/detection device is provided with a coordinate input area. The coordinate input/detection device uses first and second light-emitting units to emit light to a plurality of retro reflectors provided around the coordinate input area. The plurality of retro reflectors reflect the light from the first light-emitting unit toward a first light-receiving unit provided at one of first and second positions, and the light from the second light-emitting unit toward a second light-receiving unit provided at the other position among the first and second positions, the first and second light-receiving units corresponding to the first and second positions respectively. A position recognition unit recognizes whether each of the first and second light-receiving units is installed at the first position or the second position, based on an output signal of each of the first and second light-receiving units. Additionally, a coordinate detection unit detects coordinates of a pointing unit inserted to the coordinate input area, based on output signals of said first and second light-receiving units.

25 Claims, 20 Drawing Sheets

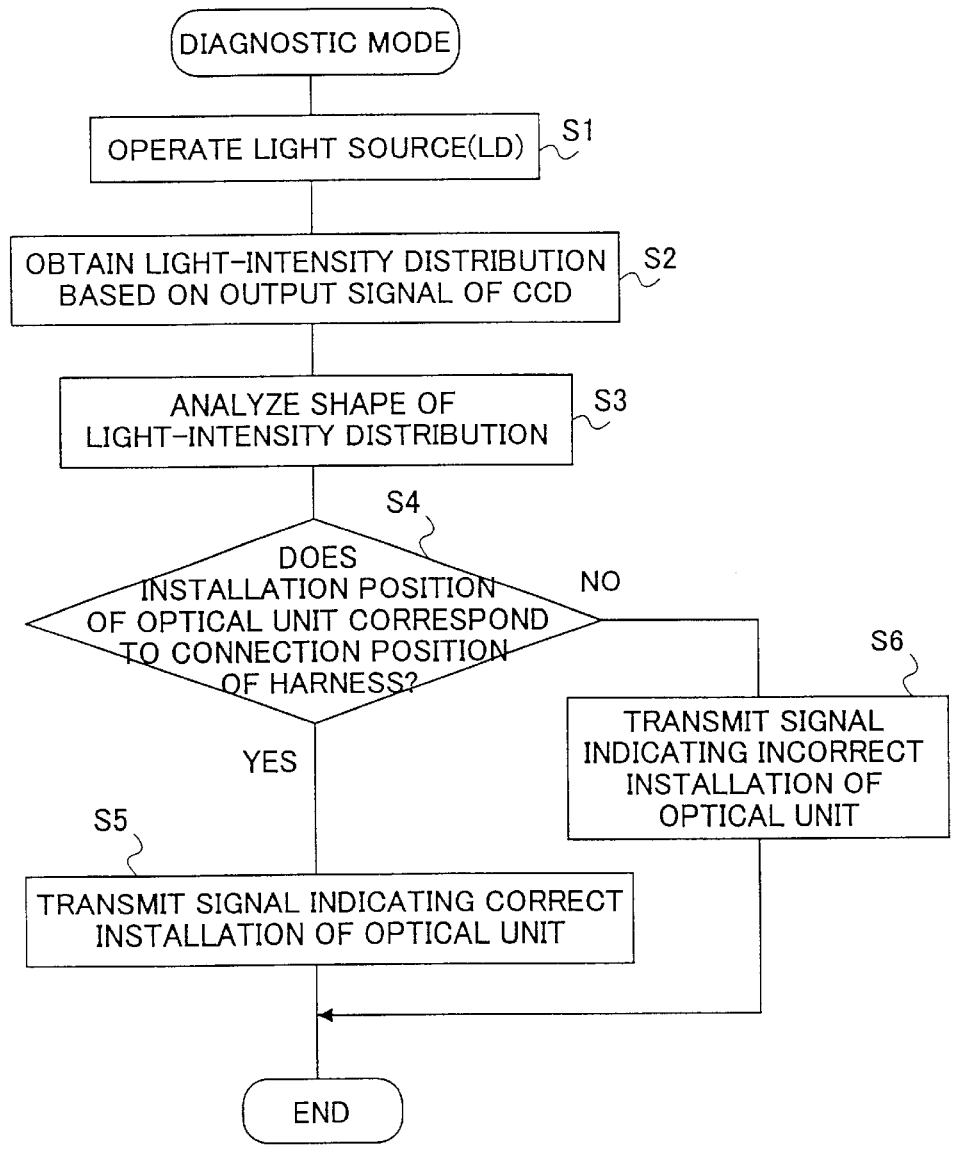

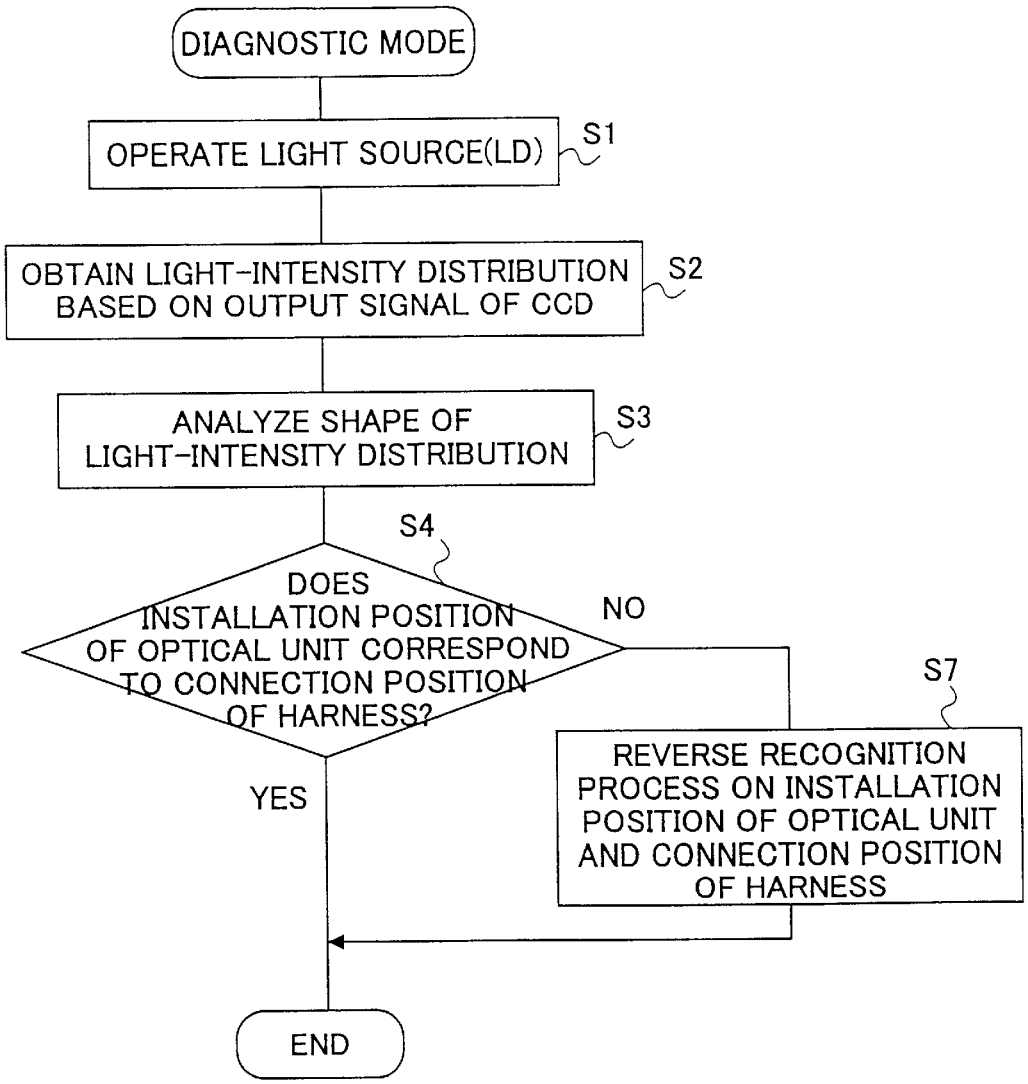

COORDINATE INPUT/DETECTION DEVICE DETECTING INSTALLATION POSITION OF LIGHT-RECEIVING DEVICE USED FOR DETECTING COORDINATES

BACKGROUND OF THE INVENTION

1. Field of the Invention

The present invention relates to a coordinate input/detection device optically detecting coordinates pointed by a finger or a pointing instrument such as a pen for inputting information or selecting the information. Additionally, the present invention relates to an electronic blackboard utilizing the coordinate input/detection device, and a recording medium storing a program readable by a computer and installed in the computer to control the coordinate input/detection device. Furthermore, the present invention relates to a light-receiving device applied to the coordinate input/detection device for detecting the coordinates and a method of detecting an installation position of the light-receiving device in the coordinate input/detection device.

2. Description of the Related Art

There has been an electronic blackboard that can read handwriting information written by use of a writing implement on a writing surface such as a whiteboard or a sheet of paper by an exclusive scanner, and can print the handwriting information on a recording sheet by an exclusive printer. Additionally, an electronic blackboard system has been provided recently, the electronic blackboard system including a coordinate input/detection device on a writing surface of an electronic blackboard, thereby enabling input of handwriting information written on the writing surface to a computer such as a personal computer in real time. Such an electronic blackboard system is, for example, the Soft Board manufactured by Microfield Graphics, Inc. Additionally, an application of the electronic blackboard system has led to production of an electronic blackboard system including a display device as a writing surface recently. For example, the Smart 2000 manufactured by SMART Technologies, Inc is one of electronic blackboard systems including a display device as a writing surface. The electronic blackboard system including the display device as the writing surface has an advantage of displaying handwriting information on a top of an image displayed on the display device as an overwritten image, and thus has been used in wide areas such as business and educational scenes including a meeting and a presentation, obtaining high evaluation for its effectiveness. Additionally, the electronic blackboard system may be used as an electronic conference system by including a communication function transmitting such as images and sounds, and by connecting remote places with each other by use of communication lines.

Various types of coordinate detection methods have been in practical use or have been suggested for the coordinate input/detection devices used in the above-described electronic blackboard systems. For example, one of the methods detects an electric change by use of static or electromagnetic induction when a user pushes a coordinate inputting surface by using a pen, or when the pen approaches the coordinate inputting surface. Additionally, Japanese Laid-Open Patent Application No. 61-239322 discloses a touch-panel coordinate input/detection device utilizing an ultrasonic wave as a coordinate detection method. To be concrete, the touch-panel coordinate input/detection device outputs a surface acoustic wave onto a panel, and determines a point on the panel touched by a user by detecting the surface acoustic wave weakened by the user touching the point. However, the touch-panel coordinate input/detection device must include a touch panel as a physical coordinate inputting surface for obtaining handwriting information. Compared to the touch-panel coordinate input/detection device, a coordinate input/detection device by which a user can input handwriting information without preparing a physical coordinate inputting surface, for instance, an optical coordinate input/detection device, is more appropriate for increasing a usability of an electronic blackboard system.

The optical coordinate input/detection device has been provided with various methods of detecting coordinates. For instance, Japanese Laid-Open Patent Application No. 8-240407 discloses a method of detecting coordinates by use of two optical units, each optical unit including infrared CCD (Charge Coupled Device) cameras, and an infrared LED (Light Emitting Diode) that is attached to a pointing instrument inserted to a coordinate input area. Additionally, Japanese Laid-Open Patent Application No. 9-319501 discloses a method of detecting coordinates by inserting a pointing instrument including a corner cube reflector as a retro reflector to a coordinate input area, in which laser beams are scanned by two optical units, and by detecting a position of the pointing instrument based on a reflected light from the corner cube reflector of the pointing instrument.

On the other hand, the applicant of the Japanese patent application corresponding to this US application suggests a method of detecting coordinates by providing a retro reflector around a coordinate input area in Japanese Priority Application No. 12-105671. An optical coordinate input/detection device disclosed by such as the Japanese Priority Application No. 12-105671 emits light in a fan shape from a light source provided in each of two optical units to the coordinate input area, reflects back the light emitted to the coordinate input area by the retro reflector provided around the coordinate input area, and detects the light reflected back by the retro reflector by using a photo detector such as a CCD array. In a case in which a pointing instrument such as a finger or a pen is in inserted to the coordinate input area, the photo detector does not receive only light corresponding to a position to which the pointing instrument is inserted since the light is blocked by the pointing instrument. Thus, the optical coordinate input/detection device can detect coordinates of the position to which the pointing instrument is inserted based on an output distribution of the photo detector provided in each of the two optical units. Accordingly, the optical coordinate input/detection device disclosed by such as the Japanese Priority Application No. 12-105671 can detect coordinates with a comparatively simple device structure.

Optical coordinate input/detection devices detecting coordinates by providing a retro reflector around a coordinate input area and by using two optical units includes two types of devices, which are an optical coordinate input/detection device including the optical units in predetermined positions, and an optical coordinate input/detection device in which a user can alter the optical units in a structure provided with a writing surface as the need arises. The latter optical coordinate input/detection device can be configured, for instance, by installing the optical units on the writing surface such as a whiteboard. In such a case, the user uses the latter optical coordinate input/detection device by connecting a harness that is provided in an optical unit and is used for a power supply and a communication, to a controller, and by connecting the controller to a personal computer, for instance. Additionally, in the optical coordinate input/detection device fixing positions of the optical units optionally, a position of each optical unit to be placed on the writing surface and a position of the harness of each optical unit to be connected with the controller are interrelated. For example, in a case of using the optical coordinate input/detection device by providing the optical units on a bottom left and right areas of the writing surface, the controller and the personal computer must correctly distinguish signals supplied from an optical unit located on the left area and from an optical unit located on the right area. If the controller or the personal computer mistakenly distinguishes the signals, the optical coordinate input/detection device becomes unable to detect coordinates correctly. Thus, the user must connect the harness supplied from the optical unit located on the left area and the harness supplied from the optical unit located on the right area respectively with a left input terminal and with a right input terminal of the controller.

In fact, even in the optical coordinate input/detection device including the optical units in predetermined positions, a manufacturer needs to install the optical units in the predetermined positions, and to connect their harnesses to the corresponding input terminals of the controller properly during a production and assembly process. In terms of installing the optical units and connecting their harnesses properly to the corresponding input terminals of the controller, there are no differences between the optical coordinate input/detection device including the optical units in the predetermined positions and the optical coordinate input/detection device in which a user can alter the optical units in a structure provided with a writing surface as the need arises. Accordingly, it is necessary to show a relation between a position to install each optical unit and a position to connect the harness of each optical unit with the controller at each optical unit and its harness. For example, the optical coordinate input/detection device providing the optical units in the left and right areas of a writing surface must show a difference between the harness of the left optical unit and the harness of the right optical unit visually by forming connectors of the harnesses differently or by coloring the harnesses differently, or must show a difference between the left optical unit and the right optical unit visually. Therefore, the optical coordinate input/detection device needs to include two visually different optical units despite the fact that structures and functions of the optical units are the same. Consequently, a variety of inconveniences such as complication of production and assembly, and an increase in costs related to parts and production arise in the optical coordinate input/detection device.

Additionally, even if the relation between the position to install each optical unit and the position to connect the harness of each optical unit with the controller is visually indicated at each optical unit and its harness, an operability of the optical coordinate input/detection device is low since a connection of each optical unit with the controller must be appropriately executed. Such a low operability of the device decreases production/assembly efficiency of the optical coordinate input/detection device including the optical units in the predetermined positions, at a manufacturer's side, and burdens a user using the optical coordinate input/detection device in which the user can alter the optical units in a structure provided with a writing surface as the need arises.

Additionally, the above-described optical coordinate input/detection devices need to recognize in advance whether the coordinate input area in which the optical units are installed has a length-side ratio higher or lower than one. For instance, in a case in which an optical coordinate input/detection device installing the optical units on a whiteboard having the length-side ratio higher than one incorrectly recognizes that the whiteboard has the length-side ratio lower than one, the optical coordinate input/detection device becomes unable to detect coordinates properly on the whiteboard. Such a problem rarely arises in a device such as an electronic blackboard system including a built-in optical coordinate input/detection device, since the device recognizes the length-side ratio of a writing surface in advance. On the other hand, the length-side ratio of such as the whiteboard is previously unknown in an optical coordinate input/detection device in which a user can attach or remove the optical units on such as the whiteboard freely, and thus the above-described problem possibly arises often in the device. In addition, an optical coordinate input/detection device includes large problems especially in a case in which the optical coordinate input/detection device is applied to such as a whiteboard possible to change its length-side ratio by rotating its surface at an angle of ninety degrees.

SUMMARY OF THE INVENTION

Accordingly, it is a general object of the present invention to provide a method of utilizing only a single type of a light-receiving unit that is used as a pair in a coordinate input/detection device, and to simplify an operation to connect a harness of the light-receiving unit to a controller or the like, by which the disadvantages described above are eliminated. More particular object of the present invention is to provide a coordinate input/detection device capable of determining a correct installation position of a light-receiving unit provided therein.

The above-described object of the present invention is achieved by a coordinate input/detection device provided with a coordinate input area, including a plurality of retro reflectors provided around the coordinate input area; a first light-emitting unit; a second light-emitting unit; a first light-receiving unit that corresponds to a first position, and is installed at one of first and second positions, at which the first light-receiving unit receives light emitted from the first light-emitting unit to the plurality of retro reflectors and reflected by the plurality of retro reflectors; a second light-receiving unit that corresponds to the second position, and is installed at the other position among the first and second positions, at which the second light-receiving unit receives the light emitted from the second light-emitting unit to the plurality of retro reflectors and reflected by the plurality of retro reflectors; and a position recognition unit recognizing whether each of the first and second light-receiving units is installed at the first position or the second position, based on an output signal of each of the first and second light-receiving units.

Output signals of the first and second light-receiving units include information for determining whether each of the first and second light-receiving units is installed at the first position or the second position, in a case in which each of the first and second light-emitting units emits the light to a retro reflector located on a longer side of the coordinate input area and a retro reflector located on a shorter side thereof, and each of the first and second light-receiving units receives the light reflected by the retro reflectors, the retro reflectors being adjacent to each other. Such information includes, for instance, a shape of an output waveform of the first or second light-receiving unit, the output waveform corresponding to a space between the retro reflectors, or a ratio of lengths of output waveforms of the first and second light-receiving units, the output waveforms corresponding to the retro reflector located on the longer side of the coordinate input area and the retro reflector located on the shorter side thereof respectively. Thus, the position recognition unit can recognize the installation positions of the first and second light-receiving units by use of the information, thereby determining whether harnesses of the first and second light-receiving units are correctly connected to such as a controller for the first and second light-receiving units. Additionally, only a single type of a light-receiving unit is necessary to be used as the first and second light-receiving units since the coordinate input/detection device can detect misconnections of the first and second light-receiving units.

Other objects, features and advantages of the present invention will become more apparent from the following detailed description when read in conjunction with the accompanying drawings.

BRIEF DESCRIPTION OF THE DRAWINGS

FIG. 12 is a flowchart showing a process performed by the optical coordinate input/detection device to detect whether an installation position of each optical unit is correct, according to a fourth embodiment of the present invention;

FIG. 13 is a flowchart showing another process performed by the optical coordinate input/detection device to detect whether the installation position of each optical unit is correct, according to a fifth embodiment of the present invention;

DESCRIPTION OF THE PREFERRED EMBODIMENTS

A description will now be given of preferred embodiments of the present invention, with reference to the accompanying drawings.

Figure 1:
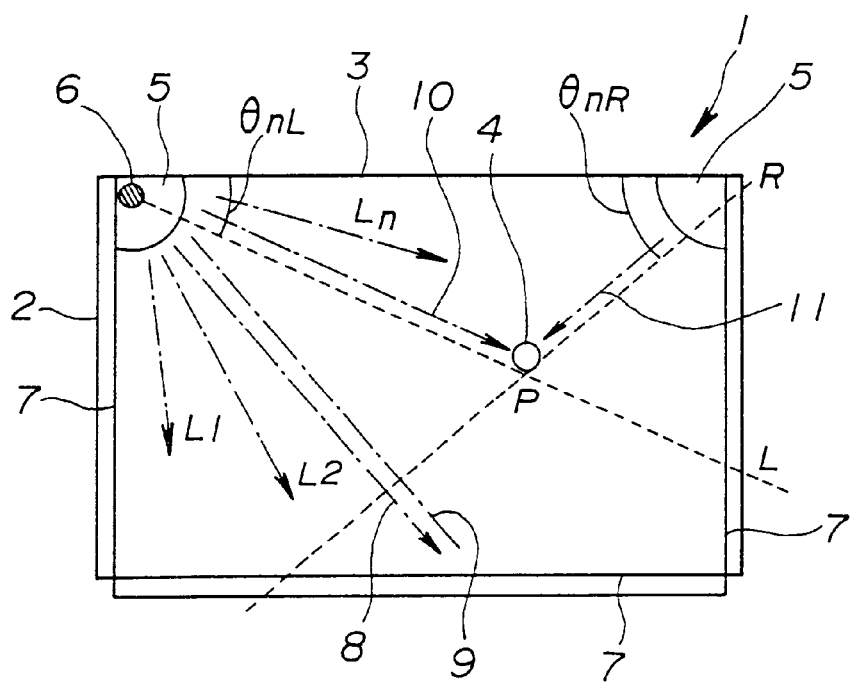
FIG. 1 is a summarized diagram showing a concept of an optical coordinate input/detection device utilizing a recursive-light blocking system, according to a first embodiment of the present invention.

FIG. 1 is a summarized diagram showing a concept of an optical coordinate input/detection device utilizing a recursive-light blocking system, according to a first embodiment of the present invention. An optical coordinate input/detection device 1 shown in FIG. 1 includes a coordinate input/detection unit 2, a coordinate input area 3, a pointing instrument 4, optical units 5, a point light source 6 and retro reflectors 7. The coordinate input area 3 is located inside the coordinate input/detection unit 2 that is a box-shaped, and has a two-dimensional shape equal to a plane or almost a plane. Thus, a surface of a display such as a plasma display electrically displaying images or of a whiteboard on which a user writes information by use of a pen, for instance, a marker, may be considered as the coordinate input area 3. An objective of the optical coordinate input/detection device 1 is to detect coordinates of the pointing instrument 4 functioning as a light-blocking unit such as a finger of a user, a pen, or a pointing rod made from an optically opaque material in a case in which the user touches the surface of the coordinate input area 3 with the pointing instrument 4.

The optical units 5 including a left optical unit 5 and a right optical unit 5 are provided as light emitting/receiving units at top left and right corners or at bottom left and right corners of the coordinate input area 3, and emit a group of light beams (probe light) L1 through Ln to the coordinate input area 3. It should be noted that the group of light beams is actually a fan-shaped light wave moving from the point light source 6 along with a plane parallel to the coordinate input area 3. The fan-shaped light is light that is emitted from a light source, and moves to directions on a two dimensional plane parallel to the coordinate input area 3 so as to cover the entire coordinate input area 3. Additionally, the retro reflectors 7 are provided around the coordinate input area 3 so that retro-reflecting surfaces of the retro reflectors 7 face the center of the coordinate input area 3. Each of the retro reflectors 7 has a characteristic to reflect incident light back to a direction from which the incident light is emitted regardless of an angle of incidence. For example, a beam 8 of the fan-shaped light wave emitted from the left optical unit 5 is reflected by one of the retro reflectors 7, and moves back as a recursively-reflected light 9 on the same path to the left optical unit 5. Each of the optical units 5 includes a later-described light-receiving unit. For instance, the left optical unit 5 can determine if the recursive light corresponding to each probe light L1 through Ln has returned to the light-receiving unit.

For example, in a case in which a user touches a point P on the coordinate input area 3 by a finger as the pointing instrument 4, a probe light 10 emitted from the left optical unit 5 does not reach the retro reflectors 7 since the probe light 10 is blocked by the finger at the position P. Thus, the optical coordinate input/detection device 1 can determine the fact that the pointing instrument 4 has been inserted on a line L that is an extension line of the probe light 10 by detecting a condition in which the left optical unit 5 does not receive a recursive light corresponding to the probe light 10. Similarly, the optical coordinate input/detection device 1 can determine the fact that the pointing instrument 4 has been inserted on a line R that is an extension line of a probe light 11, by emitting the probe light from the right optical unit 5 located at the top right corner of the coordinate input area 3, and by detecting a condition that the right optical unit 5 does not receive a recursive light corresponding to the probe light 11. If having obtained positions of the lines L and R on the coordinate input area 3, the optical coordinate input/detection device 1 can obtain coordinates of the pointing instrument 4 by calculating coordinates of the point P based on the positions of the lines L and R.

Figure 2:
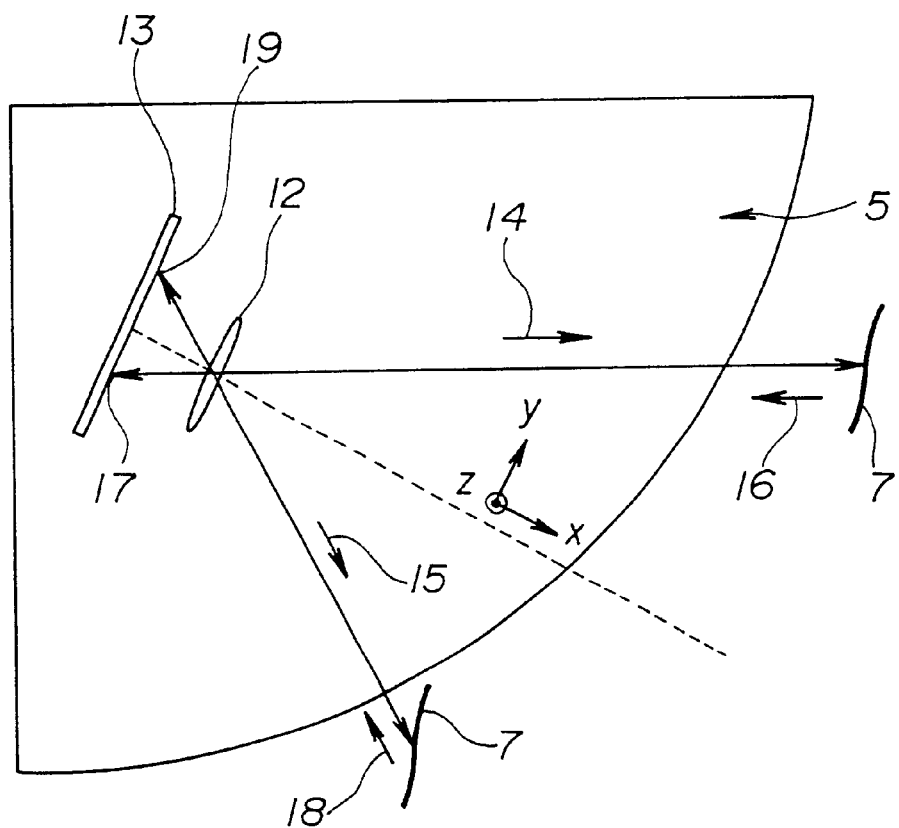
FIG. 2 is a summarized diagram showing an internal structure of an optical unit, according to the first embodiment.
Figure 5:
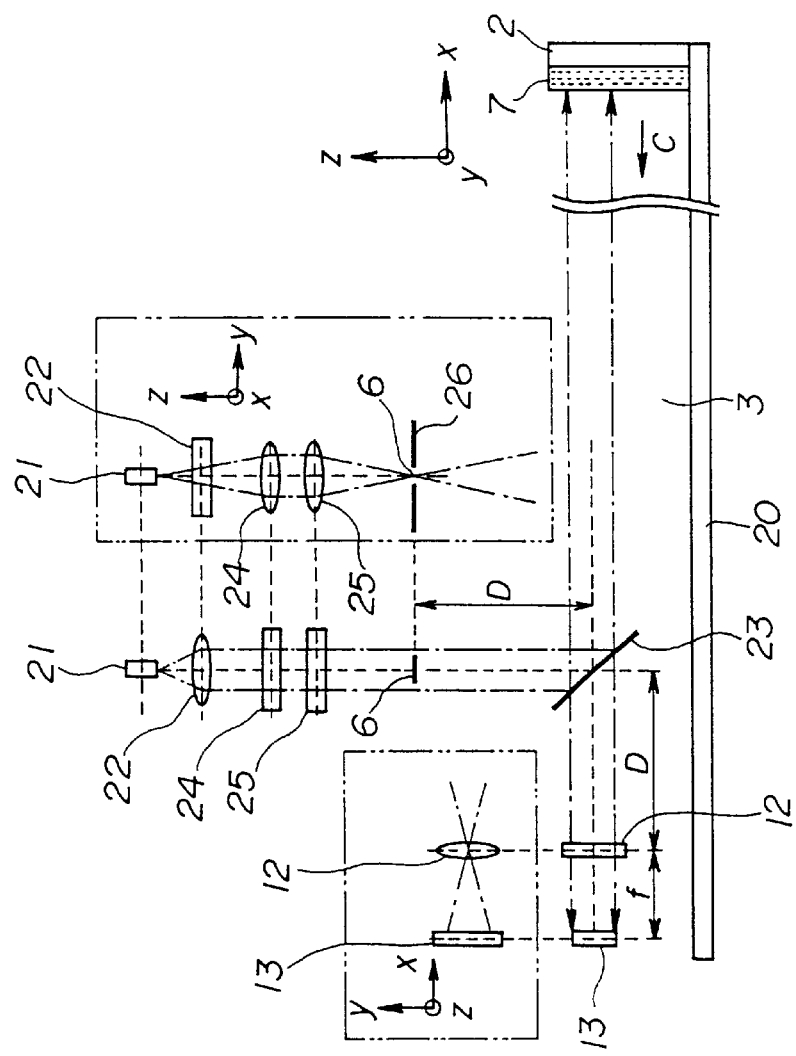
FIG. 5 is a cross sectional diagram showing installation of one of the optical units onto a surface of a display.

A description will now be given of a structure to detect a probe light blocked by the pointing instrument 4 among a group of the probe light L1 through Ln. FIG. 2 is a summarized diagram showing an internal structure of the optical unit 5 according to the first embodiment. More particularly, FIG. 2 is the summarized diagram showing the internal structure of the optical unit 5 seen from a direction perpendicular to the coordinate input area 3. For a simplification of the description, the description will be given in a two-dimensional surface parallel to the coordinate input area 3. The optical unit 5 shown in FIG. 5 is the left optical unit 5 including the point light source 6, a light-collecting lens 12 and a light-receiving device 13. The right optical unit 5 functions similarly as the left optical unit 5. The point light source 6 emits light in a fan shape in directions opposite to the light-receiving device 13 seen from a light source. Fan-shaped light emitted from the point light source 6 composes a group of beams moving to directions of arrows 14 and 15, and other directions. A beam moving in the direction of the arrow 14 is reflected by one of the retro reflector 7 to a direction of an arrow 16, and arrives at a position 17 of the light-receiving device 13 through the light-collecting lens 12. Additionally, a beam moving in the direction of the arrow 15 is reflected by one of the retro reflector 7 to a direction of an arrow 18, and arrives at a position 19 of the light-receiving device 13 through the light-collecting lens 12. As described above, the light emitted from the point light source 6 and reflected by one of the retro reflectors 7 back to their original paths to the retro reflectors 7 arrives at various positions on the light-receiving device 13 by operations of the light-collecting lens 12. If a beam is blocked by an insertion of the pointing instrument 4 at a point in the coordinate input area 3, a reflected beam does not arrive at a position corresponding to the reflected beam on the light-receiving device 13. Thus, the optical coordinate input/detection device 1 can determine a beam blocked by the pointing instrument 4 by inspecting a light-intensity distribution on the light-receiving device 13.

Figure 3:
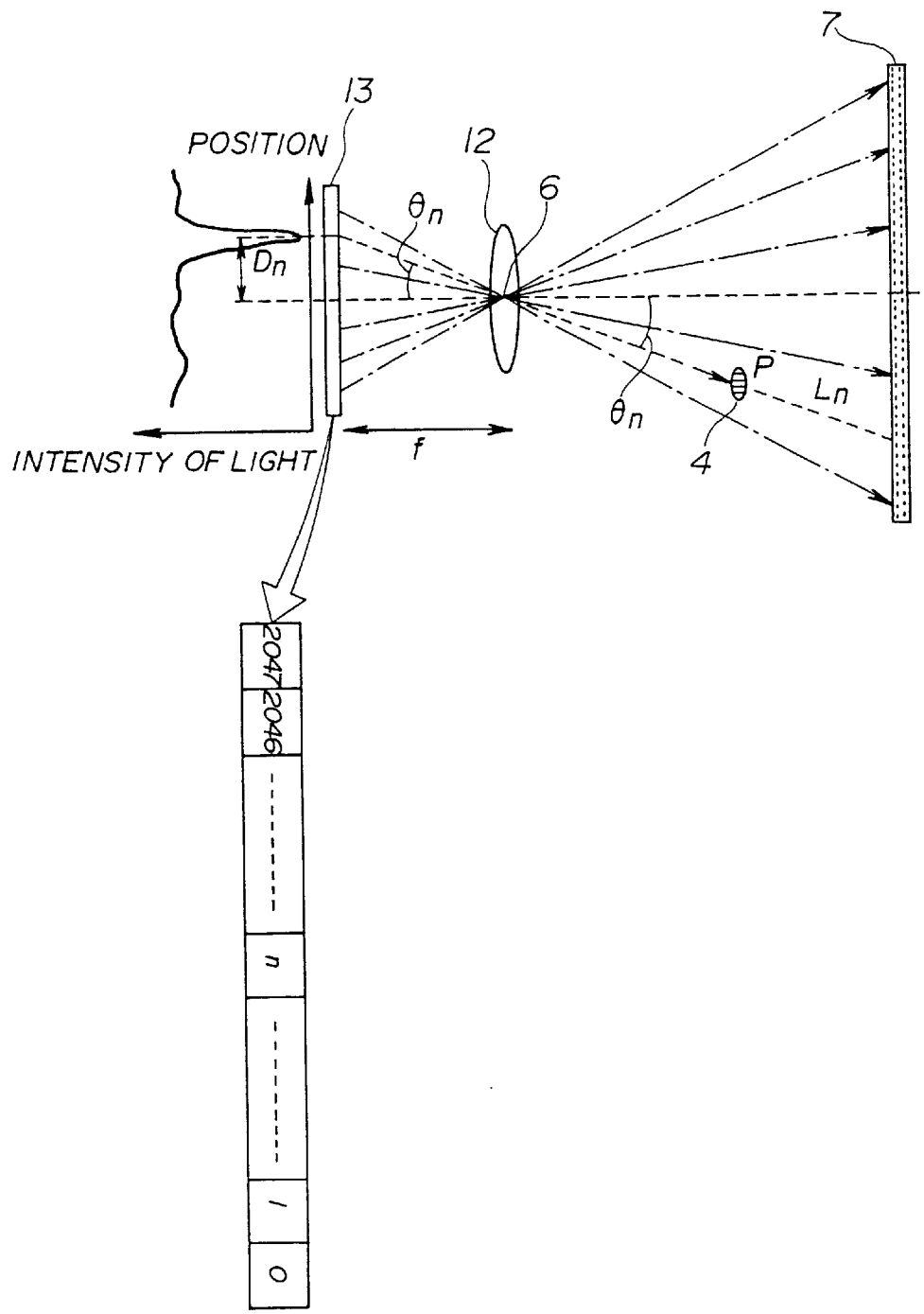
FIG. 3 is a summarized diagram showing a method of determining a beam blocked by a pointing instrument.

A detailed description will be given of the method of determining a beam blocked by the pointing instrument 4 with reference to FIG. 3. FIG. 3 is a summarized diagram showing the method of determining a beam blocked by the pointing instrument 4. The center of the light-collecting lens 12 is placed at the same place as the point light source 6. It is assumed in FIG. 3 that the light-receiving device 13 is located on a focal plane of the light-collecting lens 12 having a focal length "f". Additionally, the light-receiving device 13 includes pixels 0 through 2047, each pixel being structured to output an output signal corresponding to an intensity of light received. Accordingly, the optical coordinate input/detection device 1 recognizes output signals from the pixels of the light-receiving device 13 as the light-intensity distribution.

Each light emitted from the point light source 6 toward a right side of FIG. 3 is reflected by one of the retro reflectors 7 back to the same path as the light moves toward the right side of FIG. 3, and thus the light returns to the position of the point light source 6, which is the center of the light-collecting lens 12. The light having returned to the center of the light-collecting lens 12 then moves behind the light-colleting lens 12 toward the light-receiving device 13 in a path symmetrical to the path on which the light has taken toward the right side of FIG. 3 with respect to the center of the light-collecting lens 12. If the pointing instrument 4 is not inserted to the coordinate input area 3, the light-intensity distribution on the light-receiving device 13 is almost even through out all the pixels on the light-receiving device 13. However, if the pointing instrument 4 is inserted to the coordinate input area 3 at the point P shown in FIG. 3, the pointing instrument 4 blocks a beam passing through the point P, and an area with a low light intensity (a dark point) is created at a position Dn on the light-receiving device 13. The position Dn corresponds to an angle θn at which the beam is emitted from the point light source 6 or at which the beam passes through the light-collecting lens 12 (an angle of incidence). Accordingly, the angle θn is obtained by detection of the position Dn. In other words, the angle θn is expressed as a function of the position Dn as follows.

$$\theta n = \arctan(Dn/f) \qquad (1)$$

The angle θn and the position Dn are named an angle θnL and a position DnL respectively in the left optical unit 5 shown in FIG. 1. Similarly, the angle θn and the position Dn are named an angle θnR and a position DnR respectively in the right optical unit 5 shown in FIG. 1.

Figure 4:
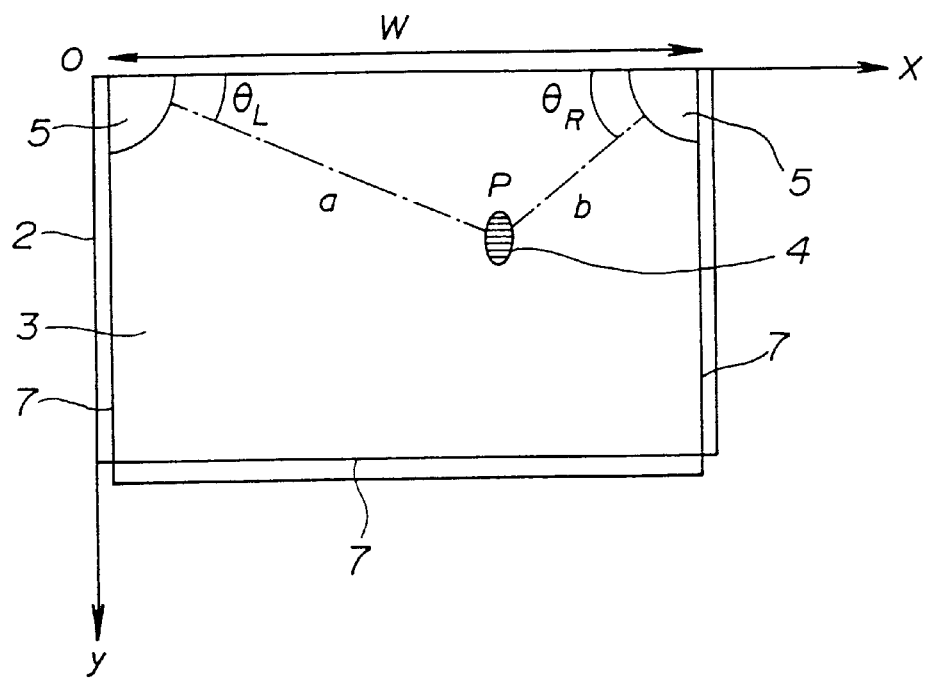
FIG. 4 is a summarized diagram showing geometrical relations between optical units and a point P in a coordinate input area.

FIG. 4 is a summarized diagram showing geometrical relations between the optical units 5 and the point P in the coordinate input area 3. An angle θL formed by the pointing instrument 4 and the coordinate input area 3 is shown in FIG. 4, and can be expressed as a function of the angle θnL obtained by the equation 1 by use of a conversion coefficient "g" corresponding to a geometrically relative positioning of the left optical unit 5 and the coordinate input area 3.

$$\theta L = g(\theta nL); \quad \theta nL = \arctan(DnL/f) \qquad (2)$$

An angle θR formed by the pointing instrument 4 and the coordinate input area 3 is shown in FIG. 4. Similarly, the angle θR can be expressed as a function of the angle θnR by use of a conversion coefficient "h" corresponding to a geometrically relative positioning of the right optical unit 5 and the coordinate input area 3, as follows.

$$\theta R = h(\theta nR); \quad \theta nR = \arctan(DnR/f) \qquad (3)$$

As shown in FIG. 4, an origin of coordinates is placed at the top left corner of the coordinate input area 3. Additionally, a distance between the left and right optical units 5 is set as a distance "w" shown in FIG. 4. Thus, coordinates (x, y) of the point P pointed by the pointing instrument 4 in the coordinate input area 3 are expressed as the following equations.

$$x = w \tan \theta R / (\tan \theta L + \tan \theta R) \quad (4)$$

$$y = w \tan \theta L \tan \theta R / (\tan \theta L + \tan \theta R) \quad (5)$$

As described above, the coordinates (x, y) of the point P can be expressed in terms of angles θL and θR. Thus, the coordinates (x, y) of the point P pointed by the pointing instrument 4 are obtained by detection of the dark points DnL and DnR located on the light-receiving device 13 of the left and right optical units 5, and by consideration of a geometrical position of the optical units 5 in the coordinate input area 3.

A description will now be given of installation of the optical units 5 in the coordinate input area 3 such as a surface of a display. FIG. 5 is a cross sectional diagram showing installation of one of the optical units 5 onto a surface of a display. A unit 20 shown in FIG. 5 indicates a display surface 20 seen from a negative-to-positive y direction shown in FIG. 2. In other words, FIG. 5 mainly shows an x-z plane view of the installation. FIG. 5 also shows an x-y plane view and a y-z plane view of a part of the installation, the views being surrounded by broken lines.

Each of the optical units 5 includes the point light source (a secondary light source) 6, the light-collecting lens (a cylindrical lens) 12, the light-receiving device 13, a light source 21, cylindrical lenses 22, 24 and 25, a half mirror 23 and a slit 26. The light source 21 can be such as a laser diode or a pinpoint LED (Light Emitting Diode) that can fairly irradiate light onto a specific point. The light source 21 emits light initially in a direction perpendicular to the display surface 20. Subsequently, the cylindrical lens 22 collimates the light emitted from the light source 21 only in an x direction so as to supply the light retuned by the half mirror 23 as a parallel light in the direction perpendicular to the display surface 20. The light collimated by the cylindrical lens 22 is then collected in a y direction by the cylindrical lenses 24 and 25 whose curvature distribution is perpendicular to that of the cylindrical lens 22. Because of operations executed by the cylindrical lenses 22, 24 and 25, an area collecting the light in a line shape is created behind the cylindrical lens 25. Such an area is provided with the slit 26 having a shape narrow in the y direction and long in the x direction. In other words, the secondary light source 6 having the line shape is formed at a position of the slit 26. The light emitted from the secondary light source 6 is reflected by the half mirror 23 to move along the display surface 20 toward one of the retro reflectors 7 in parallel to the display surface 20 as well as to spread on the x-y plane parallel to the display surface 20 forming a fan-shaped area whose center is the secondary light source 6. The light arriving at the one of the retro reflectors 7 is reflected by the one of the retro reflectors 7 back to the same path as the light has taken to reach the one of the retro reflectors 7, and returns to the half mirror 23 in a direction C. Subsequently, the light passes through the half mirror 23, and moves in the direction C parallel to the display surface 20 through the cylindrical lens 12 to the light-receiving device 13.

It should be noted that the secondary light source 6 and the cylindrical lens 12 are located at an identical distance D away from the half mirror 23, and thus the secondary light source 6 and the cylindrical lens 12 respectively correspond to the point light source 6 and the light-collecting lens 12 shown in FIG. 3.

Figure 6:
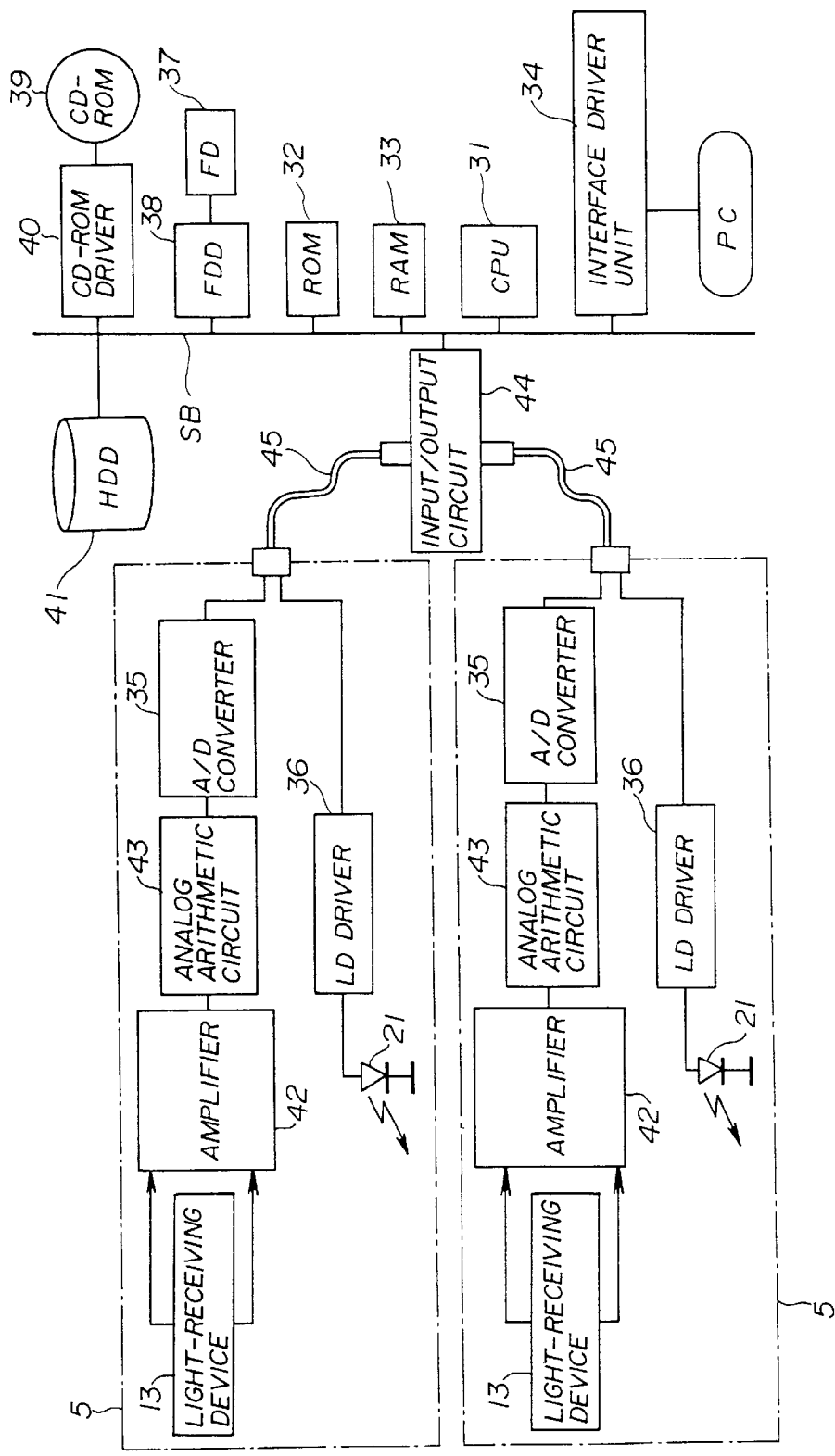
FIG. 6 is a block diagram showing a configuration of a control circuit of the optical coordinate input/detection device according to the first embodiment.

FIG. 6 is a block diagram showing a configuration of a control circuit of the optical coordinate input/detection device 1 according to the first embodiment. The control circuit shown in FIG. 6 includes the optical units 5, a CPU (Central Processing Unit) or a processing unit 31, a ROM (Read Only Memory) 32, a RAM (Random Access Memory) 33, an interface driver unit 34, a FD (Floppy Disk) 37, a FDD (Floppy Disk Driver) 38, a CD-ROM 39, a CD-ROM driver 40 and a HDD (Hard Disk Driver) 41, an input/output circuit 44, harnesses 45 and a system bus SB. Each of the optical units 5 includes the light-receiving device 13, the light source (LD) 21, an A/D (Analog/Digital) converter 35, an LD (Lighting Device) driver 36, an amplifier 42 and an analog arithmetic circuit 43. Additionally, the optical units 5 are connected through the harnesses 45 to connection terminals not shown in FIG. 6 of the input/output circuit 44 that is connected to the system bus SB. The control circuit executes a lighting control of the light source 21 and an arithmetic operation on an output signal of the light-receiving device 13. A type of the light-receiving device 13 is selected appropriately by following a light emission method of the light source 21. For example, a CCD (Charge Coupled Device) is appropriate to be used as the light-receiving device 13 in a configuration in which light emitted from the light source 21 is spread in a fan shape by use of a lens not shown in FIG. 6. On the other hand, a photo detector is appropriate to be used as the light-receiving device 13 in a configuration in which deflection scanning is executed on light emitted from the light source 21 to spread in the fan shape. A description will be given of the light emission method of the light source 21 later with reference to FIGS. 10 and 16.

The CPU 31 executes various types of arithmetic operations, and controls each unit in the control circuit. The CPU 31 is connected to the ROM 32 storing fixed data, the RAM 33 storing variable data and being used as a working area for the CPU 31, the interface driver unit 34, the A/D converter 35 and the LD driver 36 through the system bus SB. The CPU 31, the ROM 32 and the RAM 33 compose a microcomputer as a computer. Such a microcomputer is connected to the FDD 38 to which the FD 37 is loaded, the CD-ROM driver 40 to which the CD-ROM 39 is loaded, and the HDD 41 through the system bus SB. The FD 37 read by the FDD 38 and the CD-ROM 39 read by the CD-ROM driver 40 are recording mediums, each storing various types of program codes or control programs making a computer perform various processes. However, the above-mentioned recording mediums are just examples, and a recording medium storing various program codes or control programs, is not limited to the FD 37 and the CD-ROM 39. For instance, all kinds of optical disks including a CD-R (CD Recordable), a CD-R/W (CD Rewritable), a DVD-ROM and a DVD-RAM, magneto-optical disks (MO) and a memory card may be used as recording mediums. In a case of using the above-described recording mediums, devices such as a MO drive device reading the program codes stored in the recording mediums are appropriately connected to the microcomputer including the CPU 31, the ROM 32 and the RAM 33. Subsequently, the various types of program codes or control programs stored in the above-described recording mediums are read by such as the FDD 38 or the CD-ROM driver 40, and are stored in the HDD 41. Thus, the HDD 41 is also defined as a recording medium storing the various types of program codes or control programs.

An analog output (a light-intensity-distribution signal) of the light-receiving device 13 is inputted to the amplifier 42, and is amplified. The signal amplified by the amplifier 42 is then processed through the analog arithmetic circuit 43, and is converted to a digital signal by the A/D converter 35. Subsequently, the digital signal is supplied to the CPU 31 that calculates an angle to receive light by the light-receiving device 13 and coordinates of the pointing instrument 4. In other words, various types of program codes or control programs stored in such as the HDD 41 or the CD-ROM 39 are written in the RAM 33 as soon as a power is supplied to the control circuit, in which the CPU 31 performs processes corresponding to the various types of program codes or control programs.

A configuration of each of the optical units 5 is not limited to the above-described configuration, and may only include the light-receiving device 13, the light source 21 and supplementary optical parts. In such a configuration, the A/D converter 35, the LD driver 36, the amplifier 42 and the analog arithmetic circuit 43 are provided on a control circuit (a microcomputer to which the CPU 31 is connected). Additionally, another embodiment of the configuration of each of the optical units 5 is to divide each optical unit 5 by composing a light-emitting unit including only the light source 21 and its supplementary optical parts, and a light-receiving unit including only the light-receiving device 13 and its supplementary optical parts.

Additionally, the above-described embodiments of the optical units 5 do not prevent the control circuit from being included in one of the optical units 5. Additionally, the control circuit preferably includes an output terminal to output calculated coordinate data to such as a personal computer through the interface driver unit 34.

According to the first embodiment, an output signal of the light-receiving device 13 provided in each of two light-receiving units includes information for determining whether each light-receiving unit is installed on the left or right side of the coordinate input area 3 in a case in which the light-emitting unit emits light to a retro reflector 7 located on a longer side of the coordinate input area 3 and a retro reflector 7 located on a shorter side thereof, and each light-receiving unit receives the light reflected by the retro reflectors 7, the retro reflectors 7 being adjacent to each other. Such information includes, for instance, a shape of an output waveform of the light-receiving device 13, the output waveform corresponding to a space between the retro reflectors 7, or a ratio of lengths of output waveforms of the light-receiving device 13, the output waveforms corresponding to the retro reflectors 7 located on the longer side of the coordinate input area 3 and the retro reflector 7 located on the shorter side thereof respectively. Thus, a position recognition unit such as the CPU 31 recognizes an installation position of each light-receiving unit by use of the information, thereby determining whether a harness of the light-receiving unit is correctly connected to such as a controller of the light-receiving unit. Additionally, the light-emitting unit and the light-receiving unit can be attached to or detached from a structure providing the coordinate input area 3 together because of the optical unit 5 including the light-emitting unit and the light-receiving unit therein. It should be noted that the coordinate input area 3 is provided, for example, by a structure such as a whiteboard or a display device displaying a handwritten image based on coordinates detected by the optical coordinate input/detection device 1.

Figure 7:
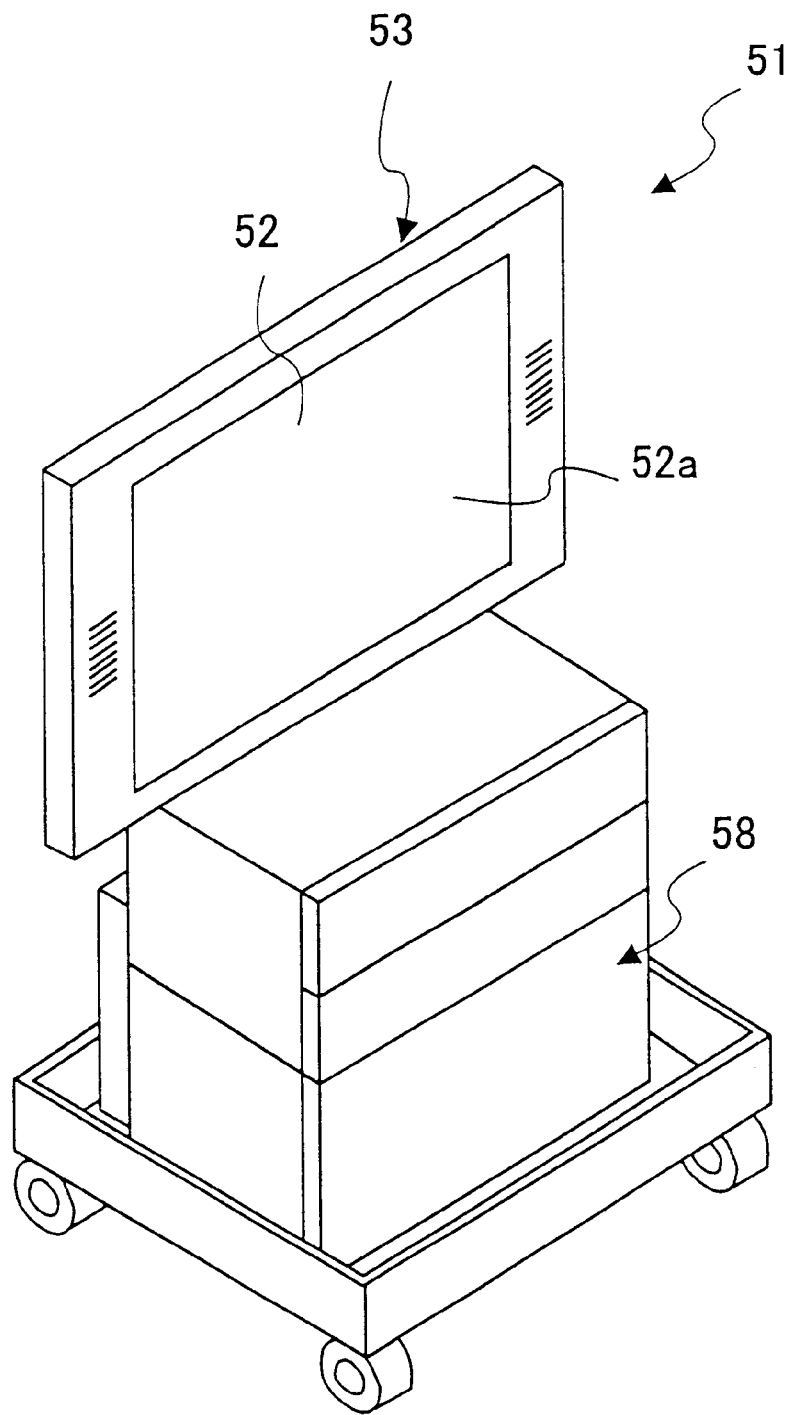
FIG. 7 is a diagram showing a diagonal view of an electronic blackboard system according to the second embodiment of the present invention.
Figure 8:
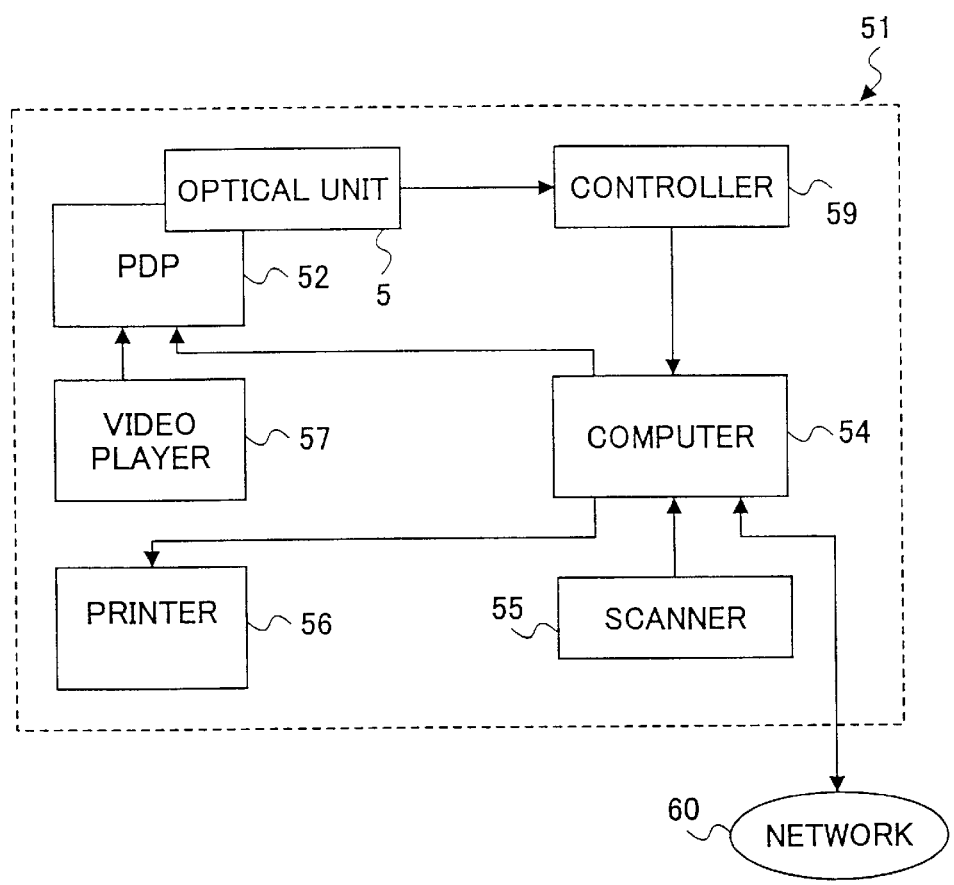
FIG. 8 is a block diagram showing a configuration of a control system of the electronic blackboard system according to the second embodiment.

A description will now be given of an electronic blackboard system to which the optical coordinate input/detection device 1 is applied, according to a second embodiment of the present invention. FIG. 7 is a diagram showing a diagonal view of an electronic blackboard system 51 according to the second embodiment of the present invention. Additionally, FIG. 8 is a block diagram showing a configuration of a control system of the electronic blackboard system 51. As shown in FIGS. 7 and 8, the electronic blackboard system 51 includes an electronic blackboard unit 53 including a PDP (Plasma Display Panel) 52 and the optical coordinate input/detection device 1, a computer 54, a scanner 55, a printer 56, a video player 57, an equipment storage unit 58 and a controller 59, as its main components. The PDP 52 is provided in the electronic blackboard system 51 as an image display device, and has a large screen size, for instance, 40 or 50 inches so that the PDP 52 can be used as an electronic blackboard. The computer 54 is, for instance, a personal computer. The scanner 54 is used for reading an image of a document. The printer 56 outputs image data to a recording sheet. The equipment storage unit 58 keeps the printer 56 and the video player 57 therein.

In the electronic blackboard unit 53, the PDP 52 and the optical coordinate input/detection device 1 are unified so that the optical units 5 of the optical coordinate input/detection device 1 are positioned on a display surface 52a of the PDP 52, the display surface 52a corresponding to the coordinate input area 3. As described above, the electronic blackboard unit 53 includes the PDP 52 and the optical coordinate input/detection device 1, thereby composing a display surface (the display surface 52a) and a writing surface (the coordinate input area 3) of the electronic blackboard system 51. Additionally, the PDP 52 includes a video input terminal and a speaker not shown in the figures, and connects various types of information and AV equipments such as a laser disk player, a DVD player and a video camera in addition to the video player 57 so that the PDP 52 can be used as a large sized monitor for the information and AV equipments. Furthermore, the PDP 52 includes an adjustment unit not shown in the figures, the adjustment unit being used for adjusting properties of the PDP 52 such as a display position, a distortion, a width and a height on an image displayed on the PDP 52.

The computer 54 is connected to the PDP 52, the scanner 55, the printer 56 and the video player 57, and controls an entire system shown in FIG. 8. Additionally, the controller 59 including a control circuit for the optical units 5 is connected to the computer 54, as the optical coordinate input/detection device 1 executing operations such as a calculation of coordinates pointed by the pointing instrument 4 in the coordinate input area 3. The optical units 5 are also connected to the computer 54 through the controller 59. To be concrete, the controller 59 is a group of units excluding the optical units 5 in the configuration shown in FIG. 6. In addition, the electronic blackboard system 51 according to the second embodiment can be connected to a network 60 through the computer 54, and thus is capable of displaying data created by other computers connected to the network 60 and of transmitting data created by the computer 54 to the other computers.

A description will now be given of applications of the present invention based on the previously described optical coordinate input/detection device 1 according to the first embodiment and electronic blackboard system 51 according to the second embodiment. Initially, a description will be given of a method of recognizing correct connections of the left and right optical units 5 to their corresponding connection terminals of the input/output circuit 44 included in the controller 54, the connection terminals being not shown in the figures, according to a third embodiment of the present invention. In other words, the method determines whether the harness 45 for the left optical unit 5 and the harness for the right optical unit 5 are connected to incorrect connection terminals of the input/output circuit 44.

Figure 9:
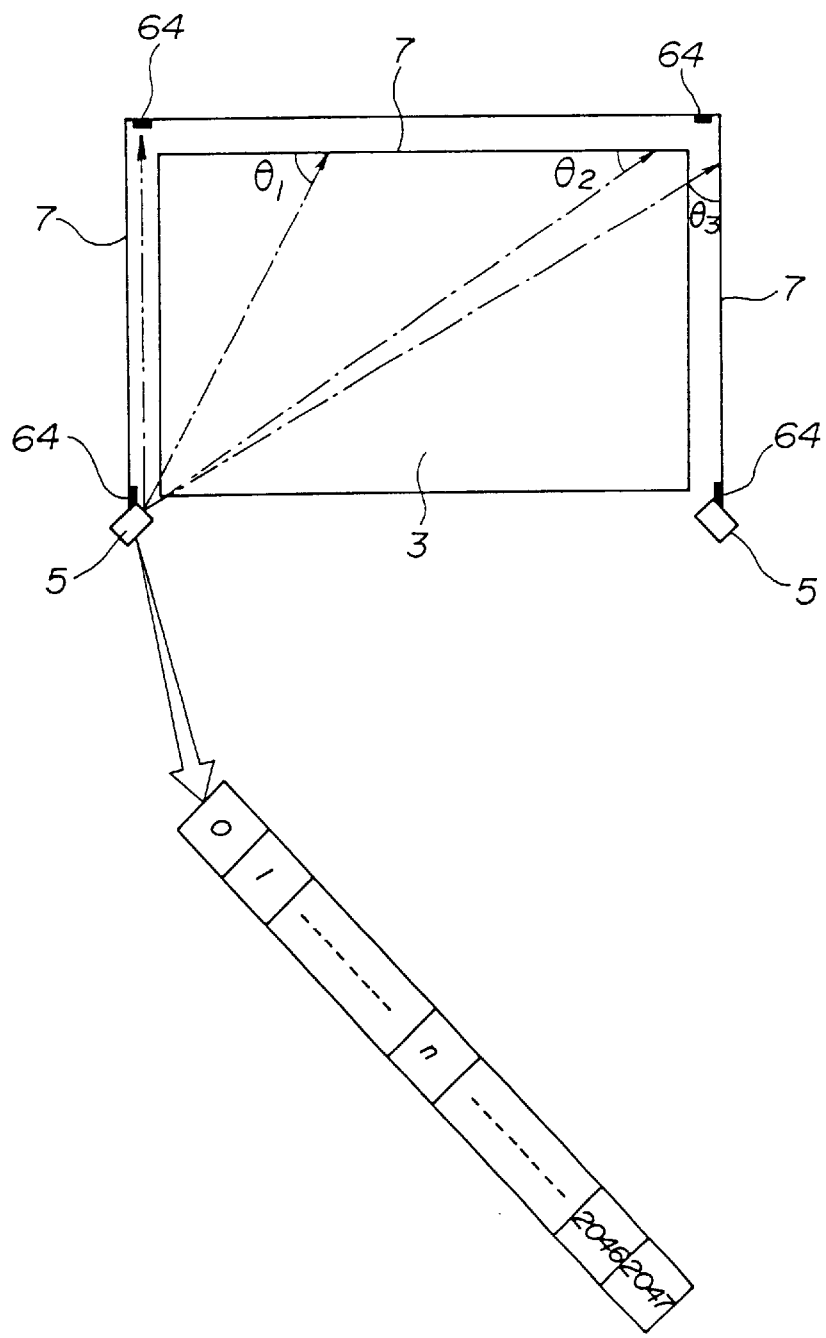
FIG. 9 is a diagram showing incidence angles of beams against retro reflectors in the coordinate input area.

FIG. 9 is a diagram showing incidence angles of beams against the retro reflectors 7 in the coordinate input area 3. In the optical coordinate input/detection device 1 according to the first embodiment, the optical units 5 are installed at the bottom left and right corners of the coordinate input area 3, as shown in FIG. 9. The retro reflectors 7 are provided on left, right and upper sides of the coordinate input area 3, in which a length of one of the retro reflector 7 provided on the upper side is longer than that of the retro reflectors 7 provided on the left and right sides.

Figure 10A:
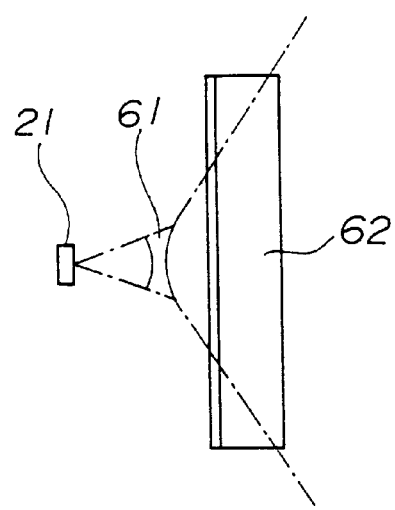
FIGS. 10A and 10B are diagrams showing a simplified view of a left or right optical unit.
Figure 10B:
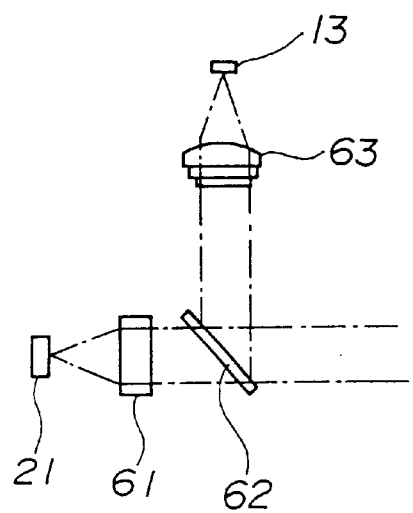

FIGS. 10A and 10B are diagrams showing a simplified view of the left or right optical unit 5. The left or right optical unit 5 shown in FIGS. 10A and 10B includes the light-receiving device 13, the light source 21, a diffusion lens 61, a half mirror 62 and a light-collecting lens 63. Basic functions of the optical units 5 are to conduct light emitted from the light source 21 as a point light source to the coordinate input area 3 in a fan shape through the diffusion lens 61, to collect a reflection light, and to make the light-receiving device 13, for instance, a CCD array sensor, receive the reflection light in a line shape. To be concrete, the light passed through the diffusion lens 61 does not spread in a direction perpendicular to a surface of the PDP 52 providing the coordinate input area 3 because of a shape of the diffusion lens 61, but becomes a light wave spreading out in the fan shape parallel to the surface of the PDP 52, as shown in FIG. 10A. Subsequently, the light wave penetrates through the half mirror 62 to the retro reflectors 7, and is reflected by the retro reflectors 7 back to a path on which the light wave takes to hit the retro reflectors 7. The light wave reflected by the retro reflectors 7 is additionally reflected by the half mirror 62 to be collected by the light-collecting lens 63 to photoelectric elements provided on a line of the CCD array sensor (the light-receiving device 13). Accordingly, the CCD array sensor determines a light-intensity distribution based on an intensity of light detected by each photoelectric element located on the line of the CCD array sensor.

Figures 11A, 11B:
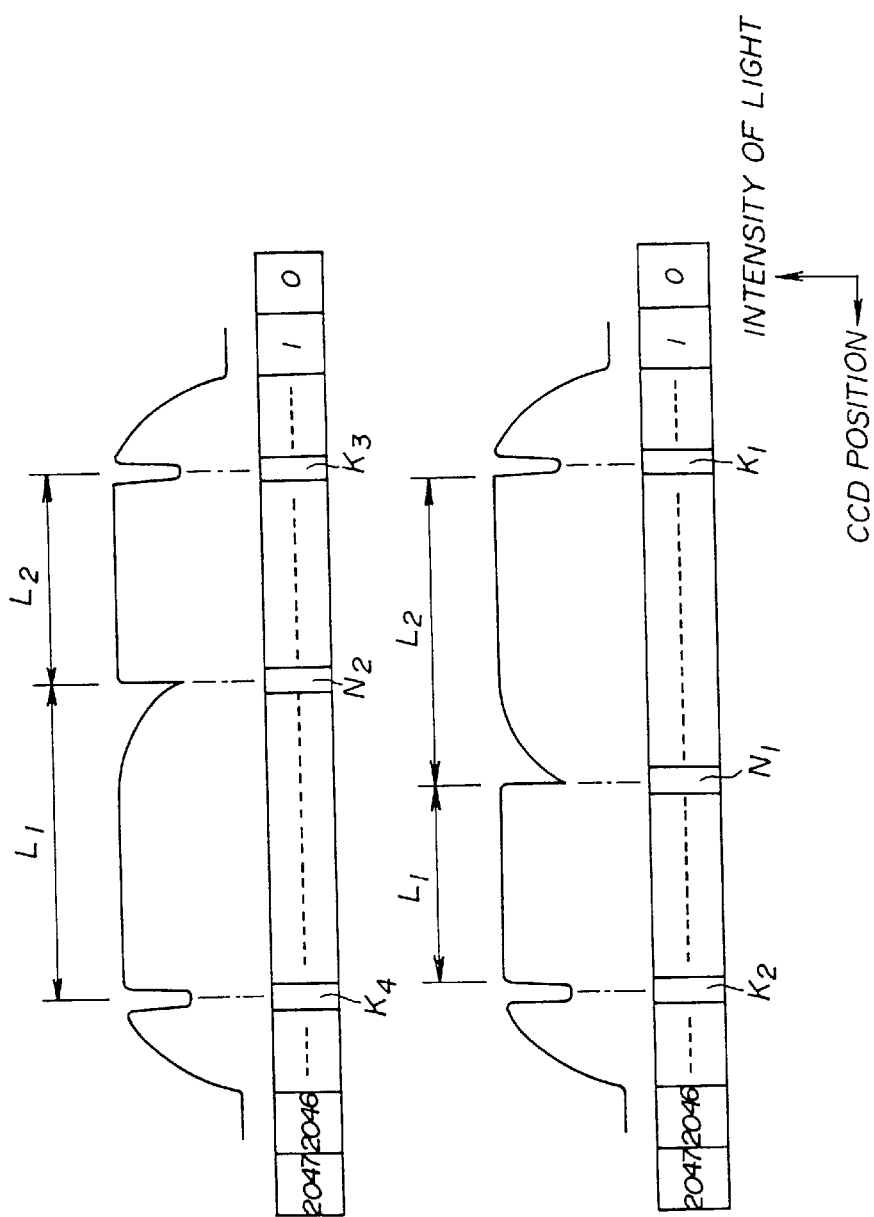
FIGS. 11A and 11B are diagrams showing a light-intensity distribution on a light-receiving device.

A description will now be given of a relation between irradiation points of the light emitted by the optical units 5 and the light-intensity distribution on the light-receiving device 13, with reference to FIGS. 9, 11A and 11B. FIGS. 11A and 11B are diagrams showing the light-intensity distribution on the light-receiving device 13. The left optical unit 5 shown in FIG. 9 includes the light-receiving device 13 having pixels 0 through 2047, as shown in FIGS. 9, 11A and 11B. The retro reflectors 7 located on the upper and right sides of the coordinate input area 3 reflect a light wave emitted in a fan shape by the left optical unit 5. The light-receiving device 13 receives the reflected light by use of its pixels 0 through 2047, and obtains the light-intensity distribution shown in FIG. 11A based on output signals of the pixels. Since an end mark 64 indicating an area with a low light reflection rate is provided on each retro reflector 7 as shown in FIG. 9, the light distribution shown in FIG. 11A indicates low intensities at pixels $K_3$ and $K_4$ respectively corresponding to a detection area of the end mark 64 located at the upper left corner and a detection area of the end mark 64 located at the bottom right corner of the optical coordinate input/detection device 1 shown in FIG. 9. Additionally, the retro reflectors provided on the left and right sides of the coordinate input area 3 are adjacent and perpendicular to the retro reflector 7 provided on the upper side of the coordinate input area 3. However, left and right edges of the retro reflector 7 provided on the upper side of the coordinate input area 3 are not connected to edges of the retro reflectors 7 provided on the left and right sides of the coordinate input area 3. Thus, the light distribution shown in FIG. 11A indicates a low intensity at a pixel $N_2$ corresponding to a detection area of a space between the retro reflectors 7 provided on the upper and right sides of the coordinate input area 3.

In addition, a reflection efficiency of each retro reflector 7 decreases, as an incidence angle of light against the retro reflector 7 becomes less. Therefore, intensities at pixels corresponding to positions having incidence angles $\theta_1$ and $\theta_3$ against the retro reflector 7 provided on the upper side of the coordinate input area 3 are high. On the other hand, an intensity at a pixel corresponding to a position having an incidence angle $\theta_2$ against the retro reflector 7 is lower than that of the pixels corresponding to the positions having the incidence angles $\theta_1$ and $\theta_3$. In other words, an incidence angle $\theta$ of light against the retro reflector 7 provided on the upper side becomes smaller, as the light is emitted to a position on the retro reflector 7 provided on the upper side closer to the space between the retro reflector 7 provided on the upper side and the retro reflector 7 provided on the right side. Thus, the closer a pixel located on the left side of the pixel C is to the pixel $N_2$ in FIG. 11A, the lower an intensity of the pixel is. On the other hand, the incidence angle $\theta$ against the retro reflector 7 provided on the right side is large enough even if a position to which the light is emitted is nearby the space between the retro reflector 7 provided on the upper side and the retro reflector 7 provided on the right side. Consequently, the light-intensity distribution shown FIG. 11A has a gradually dropping curve on the left of the pixel $N_2$ and a sharply rising edge on the right side of the pixel $N_2$.

Similarly, a light-intensity distribution on the light-receiving device 13 of the right optical unit 5 shown in FIG. 11B is obtained. Accordingly, the CPU 31 of the controller 59 can correctly recognize whether the harness 45 of each optical unit 5 is connected to the corresponding connection terminal of the input/output circuit 44, the connection terminal being not shown in the figures, by obtaining output signals indicating the light-intensity distributions, for instance, shown in FIGS. 11A and 11B, from the light-receiving devices 13.

FIG. 12 is a flowchart showing a process performed by the optical coordinate input/detection device 1 to detect whether an installation position of each optical unit 5 is correct, according to a fourth embodiment of the present invention. The process is stored in the HDD 41, and is executed by the CPU 31 in a diagnostic mode by following a control program, a part of the control program being written in the RAM 33 when the controller 59 starts up. At a step S1, a light emission step is performed. To be concrete, the light source 21 (LD) of each optical unit 5 is initially operated to emit light in a fan shape to two sides of the coordinate input area 3 on which the retro reflectors 7 are provided, the retro reflectors 7 provided around the coordinate input area 3 reflecting incident light back to a path on which the incident light takes to hit the retro reflectors 7. Subsequently, the light-receiving device 13 such as the CCD array sensor receives the light reflected by the retro reflectors 7. The controller 59 obtains a light-intensity distribution on the light-receiving device 13 by receiving output signals of the light-receiving device 13 through the input/output circuit 44, at a step S2. As described above, at the step S2, a first light reception step making the light-receiving device 13 of a first light-receiving unit 5 installed at a first position receive a reflected light from the retro reflectors 7, the first light-receiving unit 5 capable of being attached to or removed from the first position. Additionally, a second light reception step making the light-receiving device 13 of a second light-receiving unit 5 installed at a second position receive a reflected light from the retro reflectors 7, the second light-receiving unit 5 capable of being attached to or removed from the second position.

At a step S3, the controller 59 analyzes a shape of the light-intensity distribution obtained from the light-receiving device 13. For instance, the controller 59 analyzes the light-intensity distribution by focusing on dropped points corresponding to the end marks 64 in the light-intensity distribution shown in FIGS. 11A and 11B, comparing intensities on the left and right area adjacent to the deepest point, and detecting a side from which the intensity is dropping gradually toward the deepest point or a side from which the intensity is dropping sharply toward the deepest point. A method of analyzing the shape of the light-intensity distribution is not limited to the above-described method as long as the shape of the light-intensity distribution is analyzed. Subsequently, the controller 59 determines whether an analyzed light-intensity distribution is based on output signals of the light-receiving device 13 of the left optical unit 5 or of the right optical unit 5. In such a case, the controller 59 can recognize whether the installation position of each optical unit 5 corresponds to a connection position of its harness 45 to the controller 59, at a step S4, since the controller 59 can recognize correspondence of connection terminals of the input/output circuit 44 and the harnesses 45. As described above, a position recognition step recognizes whether an installation position of each light-receiving unit 5 is at the first or second position, based on a position recognition unit, a position recognition function, and output signals of the first and second light-receiving units 5.

If the CPU 31 determines that the installation position of each optical unit 5 and the connection position of its harness 45 to the controller 59 correspond to each other, the controller 59 transmits a signal indicating that each optical unit 5 has been correctly installed to the computer 54, thereby terminating the diagnostic mode, at a step S5. If the CPU 31 determines that the installation position of each optical unit 5 and the connection position of its harness 45 to the controller 59 do not correspond to each other, the controller 59 transmits a signal indicating that each optical unit 5 has been incorrectly installed to the computer 54, thereby terminating the diagnostic mode, at a step S6. As described above, at the steps S5 and S6, a notification step is executed. The computer 54 can, for instance, display a result of analyzing the correspondence of the installation position of each optical unit 5 and the connection position of its harness 45 to the controller 59, to the PDP 52 after receiving one of the signals at the step S5 or S6.

According to the fourth embodiment, in a case in which a user is notified of incorrect installation of the optical units 5, the optical units 5 can be switched, or, to be realistic, connections of the harnesses 45 to a device such as the controller 59 can be switched.

FIG. 13 is a flowchart showing another process performed by the optical coordinate input/detection device 1 to detect whether the installation position of each optical unit 5 is correct, according to a fifth embodiment of the present invention. The steps S1 through S4 shown in FIG. 13 are the same as the steps S1 through S4 shown in FIG. 12. Additionally, the process shown in FIG. 13 includes a step S7 executing an automatic correction process instead of the notification steps S5 and S6 shown in FIG. 12. At the step S7 shown in FIG. 13, the CPU 31 of the controller 59 executes a reverse recognition process reversing the installation positions of the left and right optical units 5 and the connection positions of their harnesses 45 to the controller 59, which are recognized by the CPU 31. To be concrete, in the reverse recognition process, the CPU 31 recognizes a signal from the connection terminal for the left optical unit 5 as a signal from the connection terminal for the right optical unit 5, and the signal from the connection terminal for the right optical unit 5 as the signal from the connection terminal for the left optical unit 5, in a case in which the harness 45 of the left optical unit 5 and the harness 45 of the right optical unit 5 are connected respectively to the connection terminal for the right optical unit 5 and the connection terminal for the left optical unit 5 at the input/output circuit 44.

According to the fifth embodiment, the optical coordinate input/detection device 1 can automatically correct installation position errors of the optical units 5 without a user switching the installation positions of the optical units 5 or reconnecting the harnesses 45 to devices such as the controller 59.

The description has been given of the methods of detecting whether a connection between each optical unit 5 and the controller 59 is correct, in other words, whether the installation of each optical unit 5 is correct. In the above-described embodiments, the installation position of each optical unit 5 is recognized based on output waveforms shown in FIGS. 11A and 11B of the light-receiving devices 13 as the CCD array sensors, that are, the shapes of the light-intensity distributions on the light-receiving devices 13. As shown in FIGS. 11A and 11B, distribution lengths corresponding to two adjacent retro reflectors 7 are different from each other in the light-intensity distribution, each distribution length being related to a length of the corresponding retro reflector 7. For example, a distribution length $L_1$ shown in FIG. 11A indicates a distance between the pixel $K_4$ as a detection area on the light-receiving device 13 corresponding to the end mark 64 located at the upper left corner of the coordinate input area 3, and the pixel $N_2$ as a detection area on the light-receiving device 13 corresponding to the space between the two adjacent retro reflectors 7 located on the upper side and the right side of the coordinate input area 3. Additionally, a distribution length $L_2$ shown in FIG. 11A indicates a distance between the pixel $K_3$ as a detection area on the light-receiving device 13 corresponding to the end mark 64 located at the bottom right corner of the coordinate input area 3, and the pixel $N_2$. A ratio of the distribution lengths $L_1$ and $L_2$ in the light-intensity distribution shown in FIG. 11A is equal to a ratio of lengths of the retro reflectors 7 located on the upper and right sides of the coordinate input area 3.

Similarly, a distribution length $L_1$ shown in FIG. 11B indicates a distance between a pixel $K_2$ as a detection area on the light-receiving device 13 corresponding to the end mark 64 located at the bottom left corner of the coordinate input area 3, and a pixel $N_1$ as a detection area on the light-receiving device 13 corresponding to a space between the two adjacent retro reflectors 7 located on the upper side and the left side of the coordinate input area 3. Additionally, a distribution length $L_2$ shown in FIG. 11B indicates a distance between a pixel $K_1$ as a detection area on the light-receiving device 13 corresponding to the end mark 64 located at the upper right corner of the coordinate input area 3, and the pixel $N_1$. A ratio of the distribution lengths $L_1$ and $L_2$ in the light-intensity distribution shown in FIG. 11B is equal to a ratio of lengths of the retro reflectors 7 located on the left and upper sides of the coordinate input area 3.

The optical coordinate input/detection device 1 can recognize that the distribution length $L_1$ shown in FIG. 11A corresponds to the retro reflector 7 provided on the upper side, and that the distribution length $L_2$ shown in FIG. 11A corresponds to one of the retro reflector 7 provided on the left or right side, since the distribution length $L_1$ is longer than the distribution length $L_2$ in the light-intensity distribution shown in FIG. 11A. Additionally, the optical coordinate input/detection device 1 can recognize that the distribution length $L_2$ shown in FIG. 11B corresponds to the retro reflector 7 provided on the upper side, and that the distribution length $L_1$ shown in FIG. 11B corresponds to one of the retro reflector 7 provided on the left or right side, since the distribution length $L_2$ is longer than the distribution length $L_1$ in the light-intensity distribution shown in FIG. 11B. Accordingly, the optical coordinate input/detection device 1 can determine whether each of the optical units 5 outputting output signals corresponding to the light-intensity distributions shown in FIGS. 11A and 11B is connected to the connection terminal for the left optical unit 5 or the connection terminal for the right optical unit 5 of the input/output circuit 44 by detecting whether an intensity distribution corresponding to the retro reflector 7 provided on the upper side is located on the left or right side of the light-intensity distributions shown in FIGS. 11A and 11B. If the intensity distribution corresponding to the retro reflector 7 provided on the upper side appears on pixels closer to the left end of a series of the pixels 0 through 2047 provided in the light-receiving device 13, the left optical unit 5 outputs an output signal forming the intensity distribution corresponding to the retro reflector 7 provided on the upper side. On the other hand, if the intensity distribution corresponding to the retro reflector 7 provided on the upper side appears on pixels closer to the right end of the series of the pixels, the right optical unit 5 outputs the output signal forming the intensity distribution corresponding to the retro reflector 7 provided on the upper side.

Figure 14:
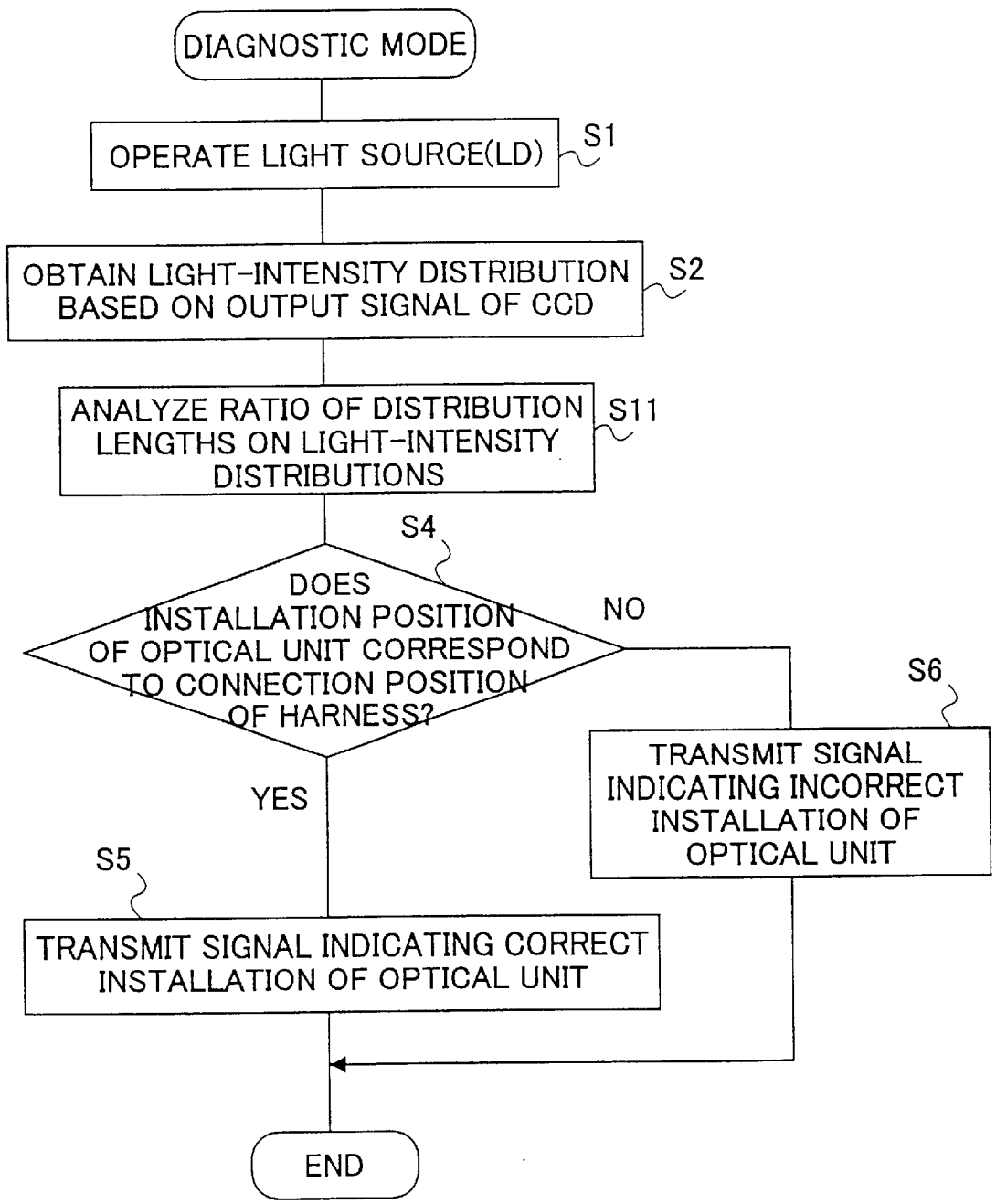
FIG. 14 is a flowchart showing a process performed by the optical coordinate input/detection device to detect whether the installation position of each optical unit is correct, according to a sixth embodiment of the present invention.
Figure 15:
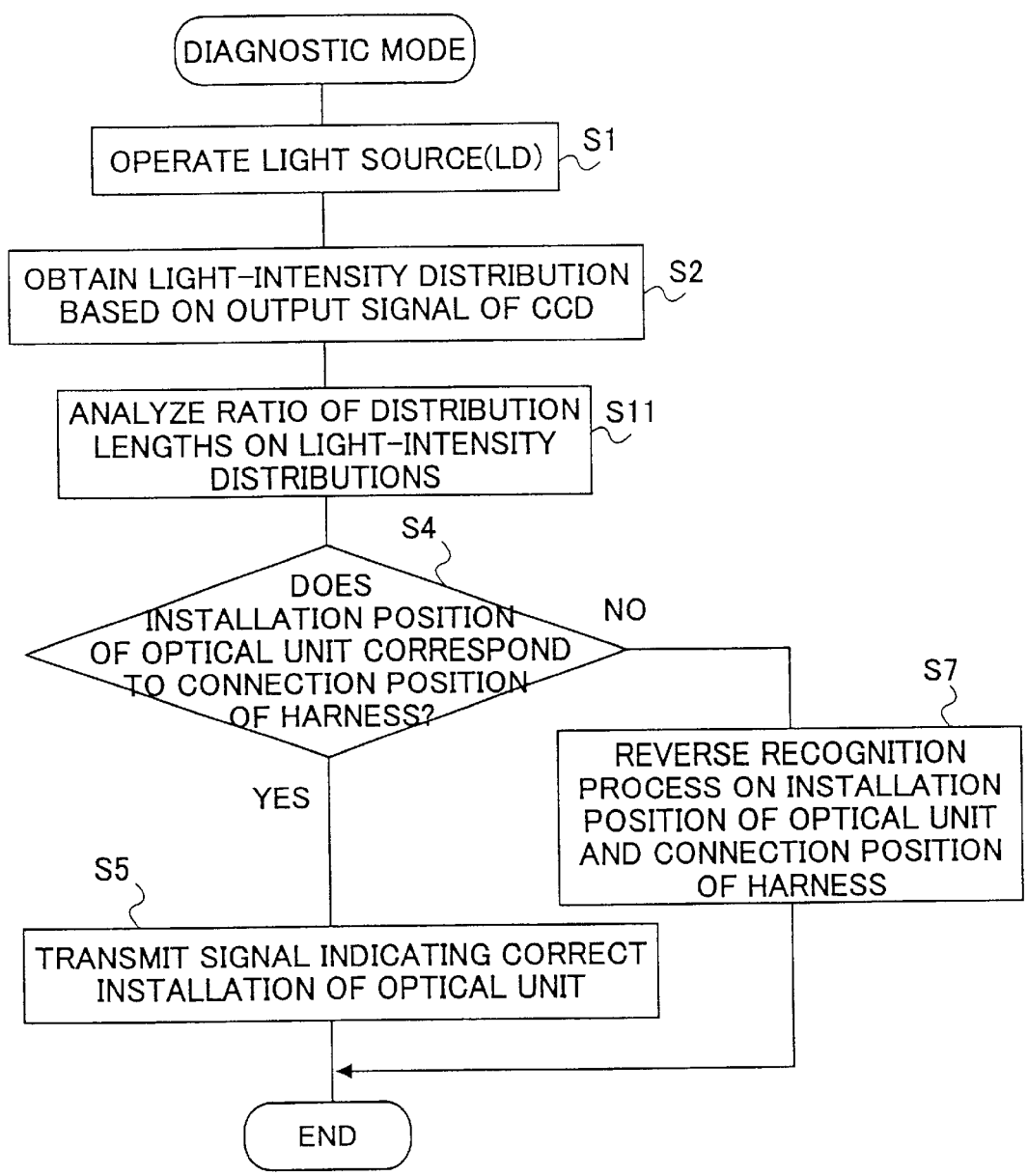
FIG. 15 is a flowchart showing a process performed by the optical coordinate input/detection device to detect whether the installation position of each optical unit is correct, according to a seventh embodiment of the present invention.

FIG. 14 is a flowchart showing a process performed by the optical coordinate input/detection device 1 to detect whether the installation position of each optical unit 5 is correct, according to a sixth embodiment of the present invention. Additionally, FIG. 15 is a flowchart showing a process performed by the optical coordinate input/detection device 1 to detect whether the installation position of each optical unit 5 is correct, according to a seventh embodiment of the present invention. In the sixth embodiment shown in FIG. 14 and the seventh embodiment shown in FIG. 15, a step S11 analyzing a ratio of distribution lengths on a light-intensity distribution outputted from the light-receiving device 13 is substituted for the step S3 in the fourth embodiment shown in FIG. 12 and the fifth embodiment shown in FIG. 13 analyzing the shape of the light-intensity distribution. The other steps performed in the sixth and seventh embodiments are respectively equal to that of the fourth and fifth embodiments, and thus results of the processes are the same in the fourth and sixth embodiments, and in the fifth and seventh embodiments. The analysis of a ratio of distribution lengths on a light-intensity distribution outputted from the light-receiving device 13 is a process of focusing on dropped points on the light-intensity distribution between the left and right points corresponding to the end marks 64, and comparing a distance between the deepest point and the left point and a distance between the deepest point and the right point. The CPU 31 of the controller 59 can easily execute such a process since the CPU 31 is capable of locating the left and right points, and the deepest point between the left and right points.

Figure 16A:
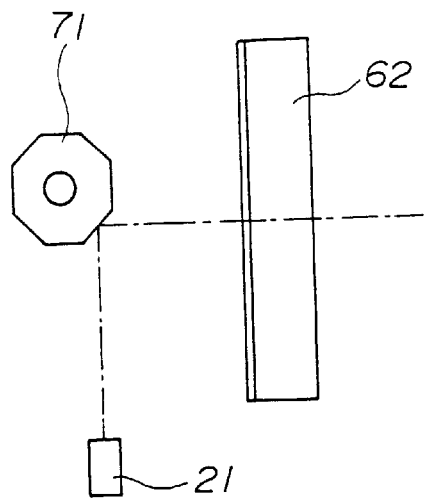
FIGS. 16A and 16B are diagrams showing a simplified view of the left or right optical unit, according to an eighth embodiment of the present invention.
Figure 16B:
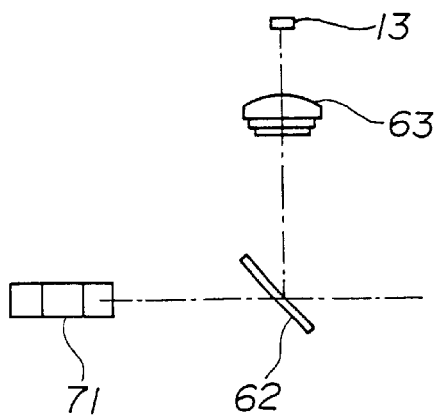

FIGS. 16A and 16B are diagrams showing a simplified view of the left or right optical unit 5, according to an eighth embodiment of the present invention. In the above-described embodiments, each optical unit 5 makes light emitted from the light source (LD) 21 into a fan shape by using the diffusion lens 61. Alternatively, the light emitted from the light source 21 can be formed into the fan shape by the left or right optical unit shown in FIGS. 16A and 16B utilizing a light scanning. The optical unit 5 shown in FIGS. 16A and 16B includes the light-receiving device 13, the light source 21, the half mirror 62, the light-collecting lens 63 and a polygonal mirror 71. The polygonal mirror 71 is provided around an axis perpendicular to the coordinate input area 3, the polygonal mirror 71 being capable of rotating around the axis. A difference between the optical unit 5 according to the eighth embodiment and the optical unit described in the other embodiments is that, in the eighth embodiment, the light source 21 emits a laser beam to the polygonal mirror 71, which executes a deflection scanning on the laser beam by rotating itself. The other processes performed by the optical unit 5 according to the eighth embodiment are the same as the optical unit 5 shown in FIGS. 10A and 10B. In other words, the optical unit 5 according to the eighth embodiment conducts the light emitted from the light source 21 such as a point light source to the coordinate input area 3 by using rotation of the polygonal mirror 71, and receives the light reflected by the retro reflectors 7 at the light-receiving device 13. To be concrete, the light reflected by the polygonal mirror 71 is scanned so that the light does not spread in a direction perpendicular to a surface of the PDP 52 providing the coordinate input area 3 but in a direction parallel to the surface of the PDP 52. Subsequently, the light penetrates through the half mirror 62 to the retro reflectors 7, and is reflected by the retro reflectors 7 back to a path on which the light takes to hit the retro reflectors 7. The light reflected by the retro reflectors 7 is additionally reflected by the half mirror 62 to be collected by the light-collecting lens 63 to photoelectric elements (pixels) provided on a line of the CCD array sensor (the light-receiving device 13). Accordingly, the CCD array sensor determines a light-intensity distribution based on an intensity of light detected by each photoelectric element located on the line of the CCD array sensor.

Figures 17A, 17B:
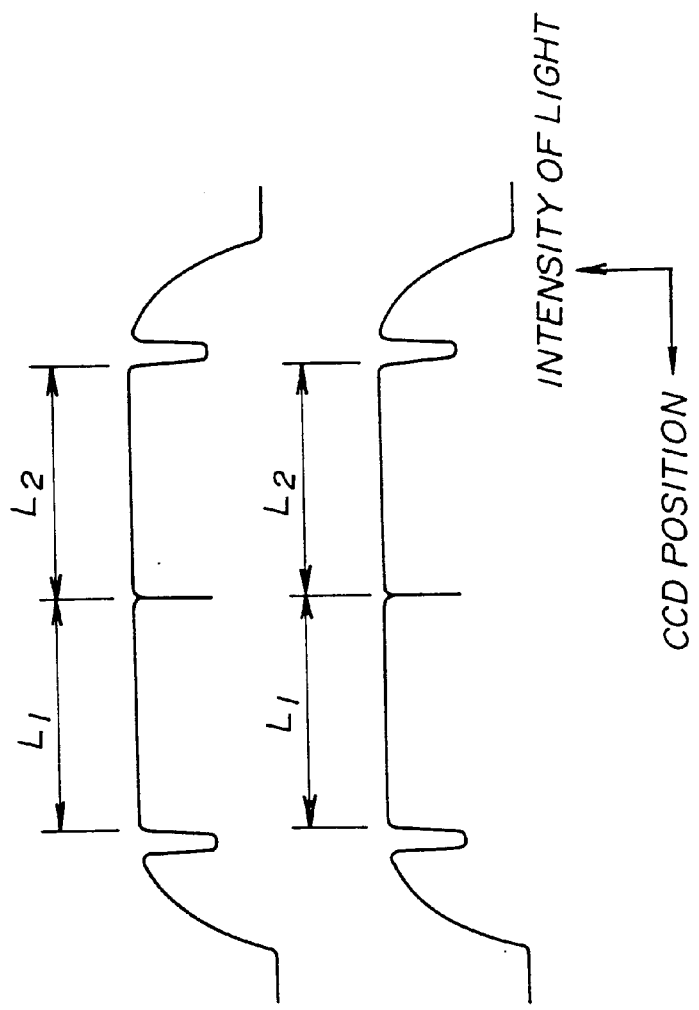
FIGS. 17A and 17B are diagrams showing the light-intensity distribution on the light-receiving device in a case in which the coordinate input area is a square.

In the above-described embodiments, it is assumed that the lengths of two adjacent retro reflectors 7 located on the sides of the coordinate input area 3 are different from each other. Accordingly, if the lengths of the two adjacent retro reflectors 7 are the same, a connection between each optical unit 5 and the controller 59, that is, the installation position of each optical unit 5 is not verified. A reason the installation position of each optical unit 5 is verified is described below, with reference to FIGS. 9, 17A and 17B. FIGS. 17A and 17B are diagrams showing the light-intensity distribution on the light-receiving device 13 in a case in which the coordinate input area 3 is a square. It is assumed that lengths of the retro reflectors provided on the upper, left and right sides of the coordinate input area 3 are the same in FIG. 9, even though FIG. 9 shows the retro reflectors 7 having different lengths. Under such an assumption, light emitted to the coordinate input area 3 in a fan shape from the left optical unit 5 is reflected by the retro reflectors 7 provided on the upper and right sides of the coordinate input area 3. Subsequently, the light-receiving device 13 receives the light reflected by the retro reflector 7, and outputs the light-intensity distribution shown in FIG. 17A. Since the end marks 64 indicating the areas with a low light reflection rate are placed on the retro reflectors 7 provided on the upper and right sides, intensities corresponding to the end marks 64 decrease on the light-intensity distribution shown in FIG. 17A. Additionally, a light reflection rate of the retro reflectors 7 decreases, as an angle of incidence against the retro reflectors 7 decreases. However, the light-intensity distribution shown in FIG. 17A is almost even throughout the entire FIG. 17A, since the angle of incidence against the retro reflectors 7 does not decrease much at any positions on the retro reflectors 7 shown in FIG. 9. Additionally, since it is assumed that the lengths of the retro reflectors provided on the upper, left and right sides of the coordinate input area 3 are the same, the light-intensity distribution shown in FIG. 17A has a symmetrical shape based on the deepest point corresponding to the space between the retro reflectors 7 provided on the upper and right sides. Thus, a ratio of the distribution length $L_1$ and the distribution length $L_2$ is one to one. Similarly, a distribution length $L_1$ and a distribution length $L_2$ in a light-intensity distribution shown in FIG. 17B are the same. Accordingly, the installation position of each optical unit 5 cannot be verified by the methods in the above-described embodiments, if lengths of two adjacent retro reflectors 7 are the same.

Figure 18A:
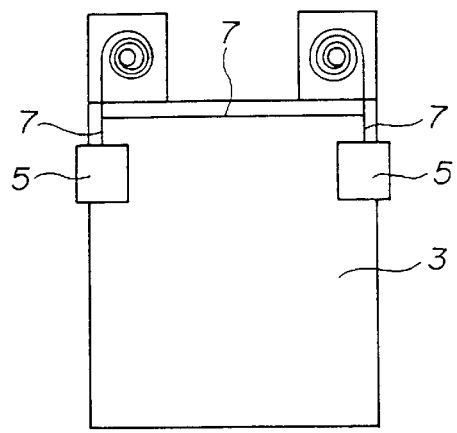
FIGS. 18A, 18B and 18C are diagrams showing a configuration of the coordinate input area, according to the ninth embodiment of the present invention.
Figure 18B:
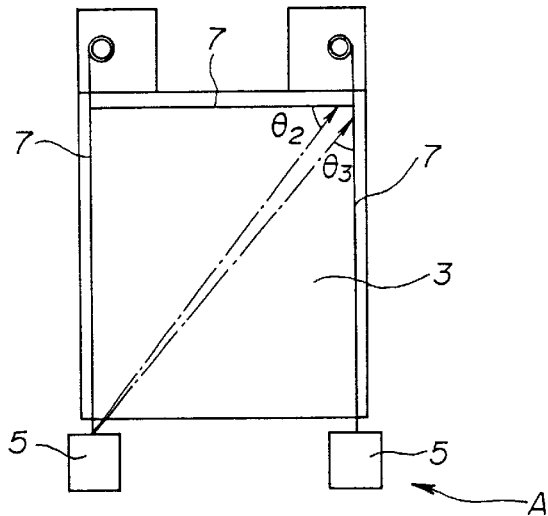
Figure 18C:
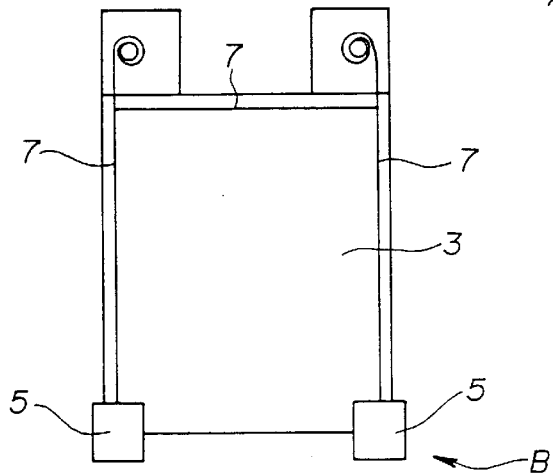

On the other hand, a ninth embodiment of the present invention shows a method of recognizing the installation position of each optical unit 5 based on the light-intensity distributions created by use of output signals of the optical units 5, even if the lengths of two adjacent retro reflectors 7 are the same in the optical coordinate input/detection device 1. FIGS. 18A, 18B and 18C are diagrams showing a configuration of the coordinate input area 3, according to the ninth embodiment of the present invention. As shown in FIG. 18A, the optical units 5 are connected to the retro reflectors 7 provided on the left and right sides of the coordinate input area 3. The optical units 5 are installed from the upper left and upper right corners of the PDP 52 (the coordinate input area 3) of the electronic blackboard unit 53, as shown in FIG. 18A, and are installed so that the optical units 5 are enabled to slide downward along the left and right sides of the PDP 52. Additionally, the optical units 5 installed in the electronic blackboard unit 53 can be fixed by an installation mechanism not shown in the figures at a temporary installation position A shown in FIG. 18B as the lowest position to which the optical units 5 can slide down, or at a primary installation position B shown in FIG. 18C slightly higher than the temporary installation position A. Additionally, the retro reflectors 7 provided on the left and right sides of the coordinate input area 3 are rolled and stored in the upper left and upper right areas of the PDP 52. In a case of placing the optical units 5 at the temporary installation position A or at the primary installation position B, a user can pull down the retro reflectors 7 to the position A or B since the retro reflectors 7 are capable of being expanded or contracted. Additionally, bottom ends of the retro reflectors 7 can be attached to or detached from the optical units 5, and are attached to the optical units 5 by the installation of the optical units 5.

When the left and right optical units 5 are installed respectively at the left and right corners of the PDP 52, the bottom ends of the retro reflectors 7 provided on the left and right sides are fixed to the left and right optical units 5. If the optical units 5 are slid down to the temporary installation position A as shown in FIG. 18B, the retro reflectors 7 provided on the left and right sides are pulled down along the left and right sides of the coordinate input area 3 in accordance with the slide down of the optical units 5, and have longer lengths than the retro reflector 7 provided on the upper side of the coordinate input area 3. As described above, a condition in which the lengths of two adjacent retro reflectors 7 are different from each other is satisfied, and thus the electronic blackboard unit 53 (the optical coordinate input/detection device 1) can detect whether a connection between each optical unit 5 and the controller 59 is correct. In a case of determining coordinates of the pointing instrument 4, the optical units 5 are slightly lifted to the primary installation position B, and are fixed at the primary installation position B.

Figure 19A:
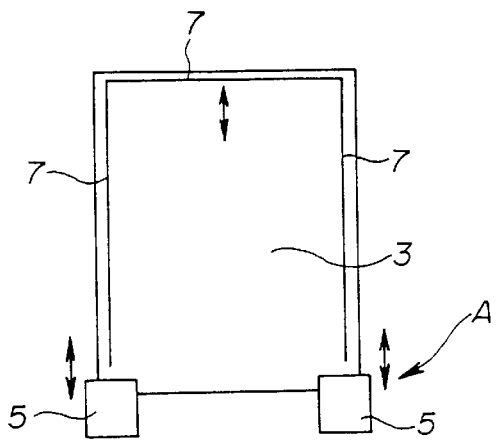
FIGS. 19A, 19B, 19C and 19D are diagrams showing a configuration of the coordinate input area, according to a tenth embodiment of the present invention.
Figure 19B:
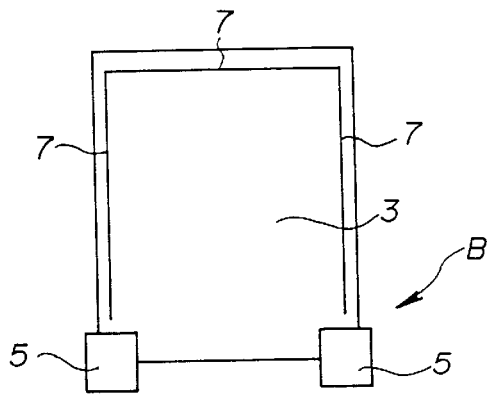
Figure 19C:
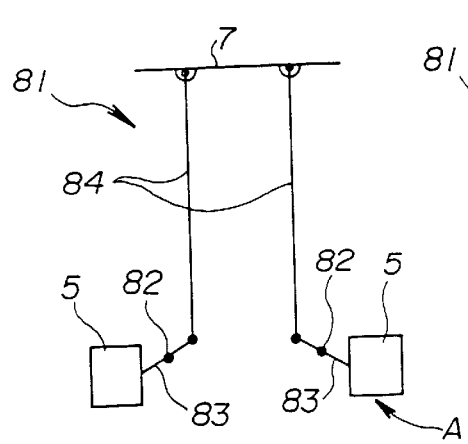
Figure 19D:
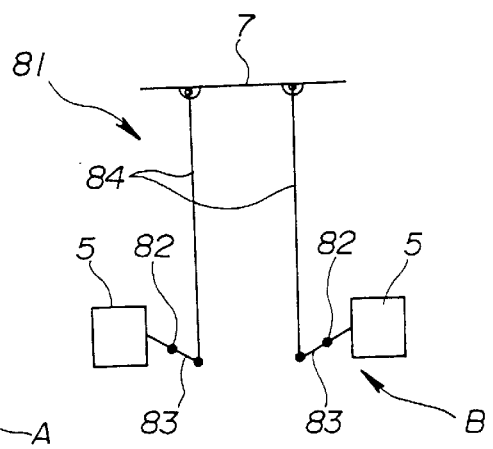

FIGS. 19A, 19B, 19C and 19D are diagrams showing a configuration of the coordinate input area 3, according to a tenth embodiment of the present invention. The configuration includes the optical units 5 connected to the retro reflector 7 provided on the upper side of the coordinate input area 3, in which positions of the optical units 5 and the retro reflector 7 can be altered. To be concrete, the optical units 5 are installed from a temporary installation position A shown in FIG. 19A located at the bottom left and right corners of the PDP 52 to the electronic blackboard unit 53 so that the optical units 5 may be slid slightly upward. Additionally, the optical units 5 installed at the temporary installation position A can be fixed by an installation mechanism not shown in the figures at a primary installation position B shown in FIG. 19B slightly higher than the temporary installation position A. The retro reflector 7 provided on the upper side is capable of being shifted vertically, and is connected to the optical units 5 by a link mechanism 81. The link mechanism 81 includes a first link 83 supported by a fulcrum 82, and a second link 84, as shown in FIGS. 19C and 19D. One end of the first link 83 is connected the optical unit 5 installed in the electronic blackboard unit 53, in which the first link 83 can be freely rotated. The other end of the first link 83 is connected to one end of the second link 84, in which the second link 84 can be freely rotated. The other end of the second link 84 is connected to the retro reflector 7 provided on the upper side of the coordinate input area 3, in which the second link 84 can be freely rotated. In a case in which the optical unit 5 connected to the one end of the first link 83 is slid vertically, the first link 83 rotates around the fulcrum 82, and the second link 84 connected to the first link 83 is shifted vertically in accordance with the rotation of the first link 83. Consequently, the retro reflector 7 provided on the upper side is slid vertically.

The retro reflector 7 provided on the upper side is placed at an upper position in the coordinate input area 3, as shown in FIGS. 19A and 19C if the optical units 5 are fixed at the temporary installation position A. On the other hand, if the optical units 5 are fixed at the primary installation position B, the retro reflector 7 provided on the upper side is placed at a lower position in the coordinate input area 3, as shown in FIGS. 19B and 19D. Additionally, whether the retro reflector 7 provided on the upper side is placed at the upper or lower position, the retro reflectors 7 provided on the left and right sides of the coordinate input area 3 are set so as to keep a continuous adjacent relation to the retro reflector 7 provided on the upper side of the coordinate input area 3. If the retro reflector 7 provided on the upper side is placed at the upper position, a length of the retro reflector 7 provided on the upper side becomes shorter than that of the retro reflectors 7 provided on the left and right sides. If the retro reflector 7 is placed at the lower position, the length of the retro reflector 7 provided on the upper side becomes equal to that of the retro reflectors 7 provided on the left and right sides.

In the above-described configuration, when the left and right optical units 5 are installed in the electronic blackboard unit 53, the left and right optical units 5 are initially fixed at the temporary installation position A, as shown in FIG. 19A. In such a condition, the lengths of the retro reflectors 7 provided on the left and right sides of the coordinate input area 3 become longer than that of the retro reflector 7 provided on the upper side thereof. Consequently, a condition in which the lengths of two adjacent retro reflectors 7 are different from each other is satisfied, and thus the electronic blackboard unit 53 (the optical coordinate input/detection device 1) can detect whether a connection between each optical unit 5 and the controller 59 is correct. In a case of determining coordinates of the pointing instrument 4, the optical units 5 are slightly lifted to the primary installation position B, and are fixed at the primary installation position B.

According to the ninth and tenth embodiments, in a case in which the optical units 5 are installed at the temporary installation position A, a ratio of lengths of two adjacent retro reflectors 7 is not one to one, and thus the optical coordinate input/detection device 1 becomes able to detect installation positions of the optical units 5 on the coordinate input area 3 based on output signals of the light-receiving devices 13 included in the optical units 5.

Figure 20:
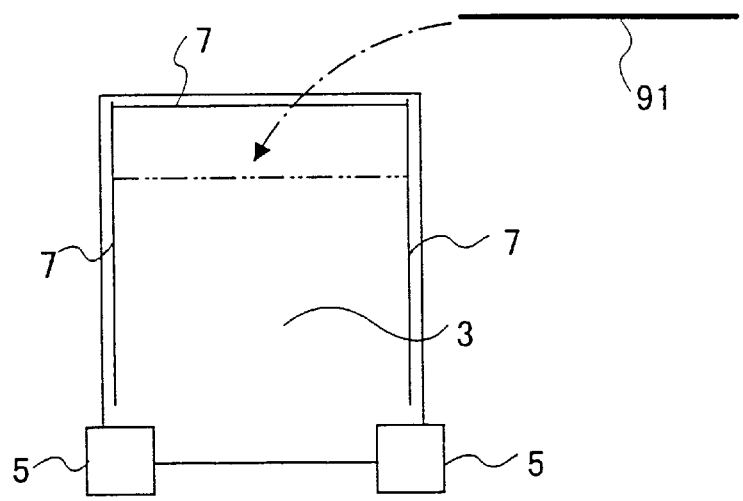
FIG. 20 is a diagram showing a configuration of the coordinate input area, according to an eleventh embodiment of the present invention.

FIG. 20 is a diagram showing a configuration of the coordinate input area 3, according to an eleventh embodiment of the present invention. The optical coordinate input/detection device 3 according to the eleventh embodiment includes the coordinate input area 3 in which the retro reflectors 7 are provided around three sides of the coordinate input area 3, each retro reflector 7 having an identical length. In addition, the optical coordinate input/detection device 1 includes a retro reflector 91 used for placing the retro reflector 91 parallel to the upper side of the coordinate input area 3. If the retro reflector 91 is placed parallel to the upper side of the coordinate input area 3 in the coordinate input area 3, as shown in FIG. 20, the lengths of the retro reflectors 7 provided on the left and right sides of the coordinate input area 3 become shorter than that of the retro reflector 91 placed as the retro reflector 7 provided on the upper side of the coordinate input area 3. Consequently, a condition in which the lengths of two adjacent retro reflectors 7 are different from each other is satisfied, and thus the electronic blackboard unit 53 (the optical coordinate input/detection device 1) can detect whether a connection between each optical unit 5 and the controller 59 is correct.

As described above, the ninth, tenth and eleventh embodiments can let the position recognition unit such as the CPU 31 recognize installation positions of the optical units 5 by creating a condition in which lengths of two adjacent retro reflectors 7 are different from each other, the condition being indispensable to embodiments of the present invention.

Figure 21:
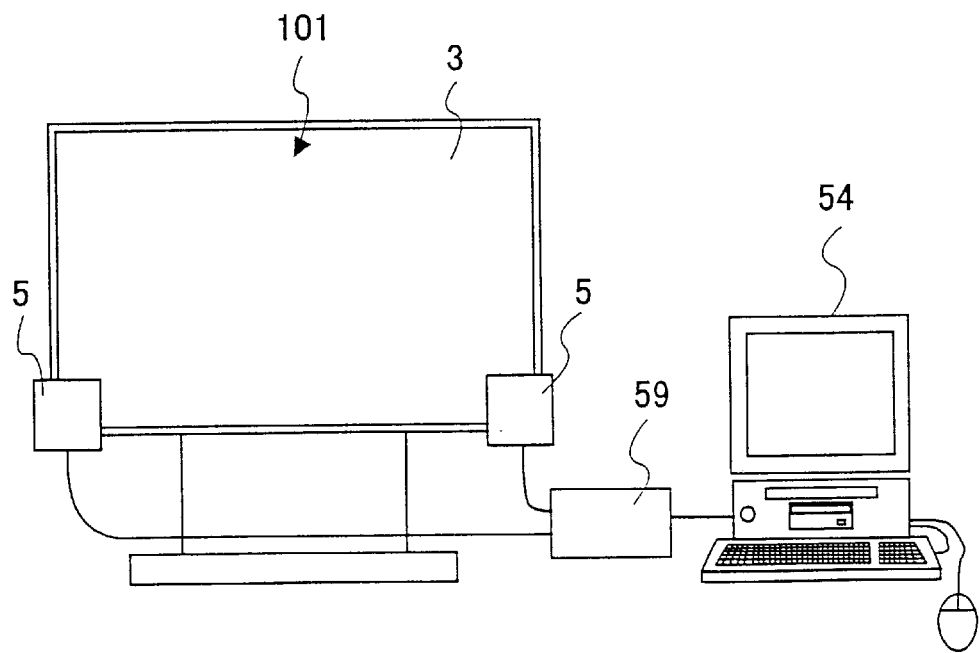
FIG. 21 is a diagram showing the optical coordinate input/detection device applied to a whiteboard, according to the twelfth embodiment of the present invention.

A description will now be given of an application of the optical coordinate input/detection device 1 to a whiteboard, according to a twelfth embodiment of the present invention. FIG. 21 is a diagram showing the optical coordinate input/detection device 1 applied to the whiteboard, according to the twelfth embodiment of the present invention. The precious embodiments show the electronic blackboard system 51 in which the optical coordinate input/detection device 1 is built in. On the other hand, the twelfth embodiment shows the optical coordinate input/detection device 1 whose optical units 5 are capable of being attached to or detached from a whiteboard 101 shown in FIG. 21, the whiteboard 101 providing the coordinate input area 3. To be concrete, the optical units 5 are installed at bottom left and right corners of the whiteboard 101, and are connected to the controller 59 through the harnesses 45. The controller 59 is connected to the computer 54, as described in the previous embodiments. Descriptions are omitted of methods of detecting input coordinates in the coordinate input area 3, and of verifying a connection between each optical unit 5 and the controller 59, in other words, of verifying an installation position of each optical unit 5, since the methods are the same as the previous embodiments.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is based on Japanese Priority Application No. 2000-040529, filed on Feb. 18, 2000, the entire contents of which are hereby incorporated by reference.

What is claimed is:

1. A coordinate input/detection device provided with a coordinate input area, comprising:

a plurality of retro reflectors provided around the coordinate input area;

a first light-emitting unit;

a second light-emitting unit;

a first light-receiving unit that corresponds to a first position, and is installed at one of first and second positions, at which said first light-receiving unit receives light emitted from said first light-emitting unit to the plurality of retro reflectors and reflected by the plurality of retro reflectors;

a second light-receiving unit that corresponds to the second position, and is installed at the other position among the first and second positions, at which said second light-receiving unit receives the light emitted from said second light-emitting unit to the plurality of retro reflectors and reflected by the plurality of retro reflectors; and a position recognition unit recognizing whether each of said first and second light-receiving units is installed at the first position or the second position, based on an output signal of each of said first and second light-receiving units, wherein a ratio of a height to a width of two adjacent retro reflectors among the plurality of retro reflectors is variable, and said position recognition unit recognizes whether each of said first and second light-receiving units is installed at the first position or the second position, in a condition in which said ratio is not one to one, if a shape of the coordinate input area is a square.

2. The coordinate input/detection device as claimed in claim 1, further comprising a coordinate detection unit detecting coordinates of a pointing unit inserted to the coordinate input area, based on output signals of said first and second light-receiving units.

3. The coordinate input/detection device as claimed in claim 1, wherein said first and second light-emitting units are unified respectively with said first and second light-receiving units.

4. The coordinate input/detection device as claimed in claim 1, wherein each of said first and second light-emitting units emits the light from a single light source through a lens to the plurality of retro reflectors.

5. The coordinate input/detection device as claimed in claim 1, wherein each of said first and second light-emitting units executes a deflection scanning on the light from a single light source, and emits the light to the plurality of retro reflectors.

6. The coordinate input/detection device as claimed in claim 1, wherein two adjacent retro reflectors among the plurality of retro reflectors have a space between them, and said position recognition unit recognizes whether each of said first and second light-receiving units is installed at the first position or the second position, based on a shape of an output waveform of each of said first and second light-receiving units, said output waveform corresponding to the space.

7. The coordinate input/detection device as claimed in claim 1, wherein said position recognition unit recognizes whether each of said first and second light-receiving units is installed at the first position or the second position, based on a ratio of lengths of output waveforms of each of said first and second light-receiving units, said output waveforms corresponding to two adjacent retro reflectors among the plurality of retro reflectors.

8. The coordinate input/detection device as claimed in claim 1, wherein lengths of the plurality of retro reflectors are predetermined.

9. The coordinate input/detection device as claimed in claim 1, wherein said ratio is variable because of the plurality of retro reflectors capable of being expanded or contracted.

10. The coordinate input/detection device as claimed in claim 1, wherein said ratio is variable because installation positions of the plurality of retro reflectors are variable.

11. The coordinate input/detection device as claimed in claim 1, further comprising a detachable retro reflector, wherein said coordinate input/detection device adjusts said ratio by installing said detachable retro reflector in the coordinate input area.

12. The coordinate input/detection device as claimed in claim 1, further comprising an installation mechanism installing said first and second light receiving units at a temporary installation position at which each of said first and second light-receiving units detects whether its installation position is the first or second position, and installing said first and second light-receiving units at a primary installation position shifted from the temporary installation position, said first and second light-receiving units detecting coordinates of a pointing unit inserted to the coordinate input area at said primary installation position.

13. The coordinate input/detection device as claimed in claim 12, further comprising a link mechanism moving the plurality of retro reflectors so that said ratio becomes one to one, in accordance with said first and second light-receiving units shifting from the temporary installation position to the primary installation position.

14. The coordinate input/detection device as claimed in claim 1, further comprising a notification unit notifying a user of information obtained by said position recognition unit about whether each of said first and second light-receiving units is installed at the first position or the second position.

15. The coordinate input/detection device as claimed in claim 1, wherein said coordinate input/detection device recognizes the output signal of said first light-receiving unit as the output signal of said second light-receiving unit, and the output signal of said second light-receiving unit as the output signal of said first light-receiving unit, if said position recognition unit detects a condition in which said first and second light-receiving units are installed at the second and first positions respectively.

16. The coordinate input/detection device as claimed in claim 1, wherein said coordinate input/detection device allows a user to attach said first and second light-receiving units to, or detach said first and second light-receiving units from the first and second positions.

17. A device by which information is written on a drawing board comprising:
a writing surface providing a coordinate input area; and
a coordinate input/detection device attached to the coordinate input area, including:
a plurality of retro reflectors provided around the coordinate input area;
a first light-emitting unit;
a second light-emitting unit;
a first light-receiving unit that corresponds to a first position, and is installed at one of first and second positions, at which said first light-receiving unit receives light emitted from said first light-emitting unit to the plurality of retro reflectors and reflected by the plurality of retro reflectors;
a second light-receiving unit that corresponds to the second position, and is installed at the other position among the first and second positions, at which said second light-receiving unit receives the light emitted from said second light-emitting unit to the plurality of retro reflectors and reflected by the plurality of retro reflectors;
a position recognition unit recognizing whether each of said first and second light-receiving units is installed at the first position or the second position based on an output signal of each of said first and second light-receiving units; and
a coordinate detection unit detecting coordinates of a pointing unit inserted to the coordinate input area based on output signals of said first and second light-receiving units,
wherein a ratio of a height to a width of two adjacent retro reflectors among the plurality of retro reflectors is variable, and said position recognition unit recognizes whether each of said first and second light-receiving units is installed at the first position or the second position, in a condition in which said ratio is not one to one, if a shape of the coordinate input area is a square.

18. The device as claimed in claim 17, wherein said writing surface is an image lay device displaying the coordinates detected by said coordinate detection unit.

19. A method of detecting installation positions of first and second light-receiving units respectively corresponding to first and second positions, in a coordinate input/detection device including a pair of light-emitting units, and a plurality of retro reflectors around a coordinate input area, said method comprising the steps of:
emitting light to the plurality of retro reflectors by use of said pair of light-emitting units;
receiving the light emitted from one of the first and second light-emitting units and reflected by the plurality of retro reflectors, by use of the first light-receiving unit installed at one of the first and second positions;
receiving the light emitted from the other light-emitting unit and reflected by the plurality of retro reflectors, by use of the second light-receiving unit installed at the other position among the first and second positions; and
recognizing whether each of said first and second light-receiving units is installed at the first position or the second position, based on an output signal of each of said first and second light-receiving units,
wherein a ratio of a height to a width of two adjacent retro reflectors among the plurality of retro reflectors is variable, and said position recognition step recognizes whether each of said first and second light-receiving units is installed at the first position or the second position, in a condition in which said ratio is not one to one, if a shape of the coordinate input area is a square.

20. The method as claimed in claim 19, comprising the step of recognizing whether each of said first and second light-receiving units is installed at the first position or the second position, based on a shape of an output waveform of each of said first and second light-receiving units, said output waveform corresponding to a space between two adjacent retro reflectors among the plurality of retro reflectors.

21. The method as claimed in claim 19, comprising the step of recognizing whether each of said first and second light-receiving units is installed at the first position or the second position, based on a ratio of lengths of output waveforms of each of said first and second light-receiving units, said output waveforms corresponding to two adjacent retro reflectors among the plurality of retro reflectors.

22. The method as claimed in claim 19, comprising the step of recognizing whether each of said first and second light-receiving units is installed at the first position or the second position, in a condition in which a ratio of a height to a width of two adjacent retro reflectors is not one to one, if a shape of the coordinate input area is a square.

23. A recording medium readable by a machine, tangibly embodying a program of instructions executable by the machine to control a coordinate input/detection device provided with a coordinate input area, said coordinate input/detection device comprising:

a plurality of retro reflectors provided around the coordinate input area;

a first light-emitting unit;

a second light-emitting unit;

a first light-receiving unit that corresponds to a first position, and is installed at one of first and second positions, at which said first light receiving unit receives light emitted from said first light-emitting unit to the plurality of retro reflectors and reflected by the plurality of retro reflectors;

a second light-receiving unit that corresponds to the second position, and is installed at the other position among the first and second positions, at which said second light-receiving unit receives the light emitted from said second light-emitting unit to the plurality of retro reflectors and reflected by the plurality of retro reflectors; and a coordinate detection unit detecting coordinates of a pointing unit inserted to the coordinate input area based on output signals of said first and second light-receiving units, wherein said program is executed by the machine to perform a position recognition function to recognize whether each of said first and second light-receiving units is installed at the first position or the second position, based on an output signal of each of said first and second light-receiving units, and wherein a ratio of a height to a width of two adjacent retro reflectors among the plurality of retro reflectors is variable, and said position recognition function recognizes whether each of said first and second light-receiving units is installed at the first position or the second position, in a condition in which said ratio is not one to one, if a shape of the coordinate input area is a square.

24. The recording medium as claimed in claim 23, wherein said position recognition function recognizes whether each of said first and second light-receiving units is installed at the first position or the second position, based on a shape of an output waveform of each of said first and second light-receiving units, said output waveform corresponding to a space between two adjacent retro reflectors among the plurality of retro reflectors.

25. The recording medium as claimed in claim 23, wherein said position recognition function recognizes whether each of said first and second light-receiving units is installed at the first position or the second position, based on a ratio of lengths of output waveforms of each of said first and second light-receiving units, said output waveforms corresponding to two adjacent retro reflectors among the plurality of retro reflectors.

* * * * *